US012650962B2

(12) United States Patent
Mukherjee et al.

(10) Patent No.: US 12,650,962 B2
(45) Date of Patent: Jun. 9, 2026

(54) COMPOSITE MODEL ANALYSIS OF TIME SERIES DATA HAVING IRREGULAR TRENDS FOR ANOMALY DETECTION

(71) Applicant: Bank of America Corporation, Charlotte, NC (US)

(72) Inventors: Maharaj Mukherjee, Poughkeepsie, NY (US); Carl Benda, Charlotte, NC (US); Colin Murphy, Charlotte, NC (US); Viraj Shah, Maharashtra (IN); Rahul Uniyal, Uttarakhand (IN); Aditya Krishnanand Chaubey, Maharashtra (IN); Vijay Yarabolu, Hyderabad (IN); Duy Minh Pham, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/794,253

(22) Filed: Aug. 5, 2024

(65) Prior Publication Data

US 2026/0037487 A1     Feb. 5, 2026

(51) Int. Cl.
G06F 16/215     (2019.01)
G06F 16/25     (2019.01)

(52) U.S. Cl.
CPC .......... G06F 16/215 (2019.01); G06F 16/254 (2019.01)

(58) Field of Classification Search
CPC .............................. G06F 16/215; G06F 16/254
See application file for complete search history.

(56) References Cited

U.S. PATENT DOCUMENTS

| | | | |
|---|---|---|---|
| 11,308,407 B1 | 4/2022 | Guha et al. | |
| 11,455,639 B2 | 9/2022 | Manske et al. | |
| 11,507,563 B2 | 11/2022 | Yeddu | |
| 12,298,990 B1 | 5/2025 | Han et al. | |

(Continued)

FOREIGN PATENT DOCUMENTS

| | | |
|---|---|---|
| CN | 112101431 A | 12/2020 |
| CN | 113139610 A | 7/2021 |

(Continued)

*Primary Examiner* — Courtney Harmon
(74) *Attorney, Agent, or Firm* — Banner & Witcoff, Ltd.

(57)     ABSTRACT

Hierarchical modelling and advanced feature engineering discover abnormalities in time series data with irregular trends. Data is collected in real time to ensure temporal integrity in the invention. Extraction filters and isolates useful data. Data cleansing removes noise and extraneous data after preliminary analysis identifies patterns and abnormalities. Feature engineering organizes cleansed data for machine learning algorithms. Primary storage stores this data for fast retrieval and extensive trend analysis. Holidays and weekends provide unique patterns in trend analysis. These trends are used to cluster data and create hierarchical predictive models, starting with a first-order model for general trends and increasing in order to refine residuals. Serializing these models improves storage and retrieval. Trend clusters are created from new data points, and algorithms detect pattern deviations. Statistical tests and machine learning classifiers identify anomalies and create alerts and remedial measures. The system monitors and analyzes incoming data to detect anomalies.

18 Claims, 11 Drawing Sheets

(56) References Cited

U.S. PATENT DOCUMENTS

| | | | |
|---|---|---|---|
| 2014/0195184 A1 | 7/2014 | Maeda et al. | |
| 2014/0304813 A1 | 10/2014 | Ma et al. | |
| 2021/0390507 A1* | 12/2021 | Reynolds | G06F 16/212 |
| 2022/0215007 A1 | 7/2022 | Bedadala et al. | |
| 2023/0118240 A1* | 4/2023 | Wong | G06Q 20/4015 |
| | | | 705/44 |
| 2023/0195715 A1 | 6/2023 | Schleith et al. | |
| 2023/0274160 A1 | 8/2023 | Mujumdar et al. | |
| 2023/0308461 A1* | 9/2023 | Flysher | G06N 20/00 |
| 2023/0359706 A1* | 11/2023 | Yang | G06F 18/2415 |
| 2024/0264810 A1* | 8/2024 | Jayaraman | G06F 3/0481 |
| 2024/0342911 A1 | 10/2024 | Sasashige et al. | |
| 2025/0028737 A1 | 1/2025 | Bai et al. | |
| 2025/0103605 A1 | 3/2025 | Gianelle et al. | |
| 2025/0124502 A1* | 4/2025 | Antonini | G06Q 40/03 |
| 2025/0165442 A1 | 5/2025 | Liu et al. | |

FOREIGN PATENT DOCUMENTS

| | | | |
|---|---|---|---|
| JP | 5301310 | B2 | 9/2013 |
| JP | 5538597 | B2 | 7/2014 |
| TW | 201510688 | A | 3/2015 |
| WO | 2011132524 | A1 | 10/2011 |

* cited by examiner

Technical Flow Diagram

COMPOSITE MODEL ANALYSIS OF TIME SERIES DATA HAVING IRREGULAR TRENDS FOR ANOMALY DETECTION

TECHNICAL FIELD

The invention pertains to the field of data processing systems utilizing artificial intelligence, with a specific focus on anomaly detection and trend analysis within time series data. The invention employs advanced machine learning techniques, including clustering algorithms and multi-order predictive models, to address the challenges of identifying and predicting anomalies in datasets disrupted by non-periodic events such as holidays and weekends or other trend influencers. By segmenting data, identifying unique trend influencers, and applying specialized models to each segment, the system ensures precise anomaly classification and response generation. This approach enhances the robustness and reliability of anomaly detection in complex time series data environments, leveraging artificial intelligence to provide innovative solutions for data analysis.

DESCRIPTION OF THE RELATED ART

The problem addressed by this invention revolves around the limitations of existing time series algorithms in accurately detecting anomalies within datasets that exhibit irregular trends. Time series data, which is data collected or recorded at successive points in time, often contains patterns such as trends and seasonality. Conventional algorithms are designed to identify these patterns, but they falter when the data does not follow a regular or predictable sequence. This is particularly problematic in scenarios where holidays or special events cause irregularities in the data that do not conform to usual seasonal patterns. For instance, in an e-commerce platform, sales data might spike unexpectedly during holidays or special promotions, leading to irregular trends that current time series models might incorrectly classify as anomalies.

Another significant challenge arises from the inherent assumption in traditional time series models that the data follows a consistent trend or pattern over time. When this assumption is violated, such as during unplanned events or sudden changes in data patterns, the models tend to misclassify these variations as anomalies. This misclassification not only reduces the accuracy of anomaly detection systems but also leads to false alarms, which can be costly and disruptive. For example, in network traffic monitoring, a sudden increase in traffic due to a legitimate software update might be flagged as a potential attack, causing unnecessary alerts and investigations.

Furthermore, current time series algorithms struggle with the concept of sub-trends within the same time cycle. In many real-world applications, data does not follow a single trend but rather multiple overlapping trends that can vary based on context or external factors. This complexity is often beyond the capability of traditional models to handle effectively. As a result, these models fail to accurately capture and analyze the nuances in the data, leading to a lack of precision in anomaly detection. In financial markets, for instance, stock prices may be influenced by a variety of factors such as economic indicators, political events, and company-specific news, creating a multifaceted data pattern that is difficult for conventional algorithms to process.

The inability to handle irregular trends and sub-trends also affects the scalability and adaptability of anomaly detection systems. In dynamic environments where data patterns change frequently, it is crucial for the detection system to adapt quickly to new trends. Traditional models, which rely on predefined patterns, are not equipped to deal with such dynamic changes. This limitation hampers the effectiveness of anomaly detection in fields like cybersecurity, where attack patterns evolve rapidly, and the ability to detect new types of threats in real time is essential.

Additionally, the lack of customized weightage for data points associated with specific events, such as holidays, further complicates the problem. In many cases, these events significantly impact data patterns, but traditional models do not account for them, leading to inaccurate anomaly detection. For example, retail sales data typically sees a spike during holiday seasons. Without adjusting the model to recognize these spikes as normal, the system might generate false positives, mistaking regular holiday sales for anomalies.

Another aspect of the problem is the inefficiency in resource utilization due to the high rate of false positives and false negatives generated by conventional time series algorithms. False positives, where normal events are flagged as anomalies, lead to unnecessary investigations and resource allocation. On the other hand, false negatives, where actual anomalies go undetected, pose a risk to the integrity and security of the system. This inefficiency is particularly detrimental in high-stakes environments like finance and critical infrastructure, where timely and accurate anomaly detection is paramount.

Moreover, the challenge of data segmentation in time series analysis is significant. Traditional models often fail to segment data effectively based on context, leading to a one-size-fits-all approach that does not consider the unique characteristics of different data segments. This lack of segmentation results in a loss of valuable insights and reduces the overall accuracy of anomaly detection. For instance, in manufacturing, different phases of the production process may have distinct data patterns that need to be analyzed separately to identify anomalies accurately.

The problem is further exacerbated by the difficulty in integrating domain-specific knowledge into existing time series models. Many industries have unique patterns and influences that affect their data, which are not accounted for by generic models. This gap in domain-specific adaptation limits the applicability and effectiveness of traditional anomaly detection systems. Data may be influenced by various factors requiring a tailored approach to anomaly detection.

Another critical issue is the challenge of real-time anomaly detection in time series data. Traditional models often require extensive computational resources and time to process and analyze data, making them unsuitable for real-time applications. In scenarios where immediate action is required, such as fraud detection in banking or threat detection in cybersecurity, the delay caused by these models can have severe consequences. The need for a solution that can provide accurate and timely anomaly detection in real-time is therefore crucial.

Overall, the limitations of existing time series algorithms in handling irregular trends, sub-trends, and domain-specific patterns create a significant gap in the field of anomaly detection. The inability to accurately and efficiently detect anomalies in dynamic and complex environments leads to false alarms, missed detections, and inefficient resource utilization. This long-felt and unmet need for a robust and adaptable anomaly detection system has driven the development of this invention, which aims to provide a comprehensive solution to these challenges by incorporating advanced modeling techniques and real-time analysis capabilities.

SUMMARY OF THE INVENTION

The first aspect of the invention provides a comprehensive solution to the intricate problem of detecting anomalies in time series data, especially when such data exhibits irregular trends due to events like holidays, weekends, or other non-periodic occurrences. This invention begins with the meticulous collection of data at the data inception point, ensuring that all relevant information is accurately captured from the outset. The data is then logged in real-time, preserving its temporal integrity, which is essential for precise trend analysis and anomaly detection.

After logging, the data enters the extraction phase. In this phase, relevant data is carefully filtered and isolated from the bulk, ensuring that only pertinent information is forwarded for further processing. This selective extraction enhances the efficiency and accuracy of subsequent analyses by focusing on the most relevant data points. Following extraction, the data undergoes preliminary analysis to identify any apparent patterns or anomalies, offering an initial understanding of the data set's characteristics.

Next, the data moves into the cleanup phase. During cleanup, any noise or irrelevant information is systematically removed from the data set. Noise refers to random fluctuations that can obscure true patterns within the data. By eliminating these extraneous elements, the data is refined, ensuring that the following steps of feature engineering and analysis are based on clean and accurate data. This step maintains the quality and reliability of the data being analyzed.

Feature engineering follows, where significant features are identified and created from the cleaned data. Features are specific attributes or properties derived from raw data, used by machine learning algorithms to make accurate predictions. Effective feature engineering transforms raw data into a structured format, highlighting the underlying patterns and trends. These engineered features are then ingested into the system's storage and primary data sources, organized for efficient retrieval and analysis.

In the trend analysis phase, sophisticated algorithms are employed to identify unique trends and patterns within the data. The system clusters the data based on identified influencers, such as holidays, weekends, or other specific events/triggers/influencers that may cause deviations from normal patterns. Clustering helps categorize the data into different segments, each representing a distinct trend. Understanding how these various factors influence the data enables accurate anomaly detection.

For each identified trend cluster, the system develops a specific predictive model tailored to that trend. These predictive models are designed to recognize the unique characteristics of each cluster and provide accurate predictions based on historical data. The models are serialized, stored in a structured format for easy retrieval and application. Serialization ensures efficient management and application of these models to new data as it comes in.

During the anomaly classification phase, new data points are analyzed to determine the relevant trend they belong to. The system selects the appropriate model for the identified trend and loads this model to classify the data point. The classification process involves comparing the new data point against the expected pattern predicted by the model. If the data point deviates significantly from the expected pattern, it is classified as an anomaly.

When an anomaly is detected, the system generates an automated response. The nature and severity of the anomaly dictate the type of response, which can range from simple alerts to complex remedial actions. Automated responses ensure that anomalies are addressed promptly and effectively, minimizing potential risks and losses. If no anomaly is detected, the process concludes without further action, allowing the system to continue monitoring and analyzing incoming data seamlessly.

The invention's framework for anomaly detection is built to ensure high accuracy and reliability. By leveraging advanced machine learning techniques and trend-specific modeling, the system can handle complex time series data with irregular trends effectively. The use of clustering and feature engineering enhances the system's ability to identify and analyze unique patterns within the data. This comprehensive approach not only improves anomaly detection but also provides valuable insights into the underlying trends and patterns within the data set.

Additionally, the invention's ability to generate automated responses to detected anomalies ensures that any issues are addressed swiftly and efficiently. This prompt action is particularly important in environments where timely responses to anomalies are necessary to prevent significant disruptions or losses. The use of serialized models allows for efficient storage and retrieval, ensuring that the system can manage large volumes of data without compromising performance. Overall, this invention represents a substantial advancement in the field of anomaly detection in time series data.

In conclusion, the first aspect of the invention offers a detailed and robust solution for detecting anomalies in time series data disrupted by irregular trends. By utilizing a combination of real-time data logging, extraction, cleanup, feature engineering, clustering, and predictive modeling, the system achieves high accuracy and reliability in anomaly detection. The invention's comprehensive approach ensures that all relevant trends and patterns are identified and analyzed, providing valuable insights and prompt responses to any detected anomalies. This makes it a highly effective tool for managing and analyzing complex time series data sets in various applications, enhancing both the accuracy and efficiency of anomaly detection processes.

The real-time data logging ensures that the temporal aspect of the data is preserved, making it possible to perform accurate trend analysis. The extraction and cleanup processes are meticulous, ensuring that only the most relevant and accurate data is used in subsequent analyses. Feature engineering transforms this clean data into a format suitable for machine learning algorithms, highlighting the underlying trends and patterns.

Clustering based on identified influencers allows the system to understand the various factors affecting the data. For each trend cluster, a specific predictive model is developed, tailored to recognize the unique characteristics of that trend. These models are serialized for efficient storage and application, ensuring that they can be easily retrieved and applied to new data.

During anomaly classification, the system uses these models to determine if a new data point deviates from the expected pattern. If an anomaly is detected, the system generates an automated response to address the issue promptly. This comprehensive and detailed approach ensures that the system can handle complex time series data with irregular trends, providing accurate and reliable anomaly detection.

The second aspect of the invention introduces a sophisticated method to overcome the limitations of single-order predictive models by employing multiple models to predict cumulative differences through higher-order effects. This advanced approach begins similarly to the first invention, with meticulous data collection at the data inception point. This collected data is then logged in real-time to preserve its temporal sequence, ensuring that all subsequent analysis is based on accurate and timely information.

Once the data is logged, it undergoes an extraction process. Relevant data is filtered and isolated, ensuring that only the most pertinent information is processed further. This step enhances the efficiency and accuracy of the analysis by focusing only on the critical data points. Following extraction, a preliminary analysis is conducted to identify any apparent patterns or anomalies, providing an initial understanding of the data set's characteristics.

The data then moves into the cleanup phase, where noise and irrelevant information are removed. Noise refers to random fluctuations that can obscure true patterns within the data. By eliminating these extraneous elements, the data is refined, ensuring that subsequent feature engineering and analysis are based on clean and accurate data. This step maintains the quality and reliability of the data being analyzed.

Feature engineering follows, involving the identification and creation of relevant features from the cleaned data. Features are specific attributes or properties derived from raw data, used by machine learning algorithms to make accurate predictions. Effective feature engineering transforms raw data into a structured format that highlights the underlying patterns and trends. These engineered features are then ingested into the system's storage and primary data sources, organized for efficient retrieval and analysis.

The invention introduces a hierarchical modeling approach to handle irregularities in time series data. Initially, a first-order model is used to predict the general trend or specific value within the data. This model captures the primary pattern but may leave residuals-differences between the actual values and the predicted values. To address these residuals, a second-order model is applied to predict the differences identified by the first-order model. This hierarchical approach continues with higher-order models successively predicting the residuals left by the previous models.

By employing multiple models, the system can accurately capture even the smallest irregular trends and anomalies. The invention focuses on ignoring nominal differences, thus concentrating on significant deviations that may indicate genuine anomalies. This refined prediction process through multiple layers of models ensures a higher degree of accuracy and reliability in anomaly detection.

In addition to the hierarchical modeling, this invention also involves clustering data into micro-clusters based on intersections of different trends. Clustering helps categorize the data into segments that represent distinct patterns, allowing for more granular analysis and model application. This approach ensures that the system can handle complex data-sets with multiple influencing factors effectively.

During anomaly classification, new data points are analyzed to determine the relevant trend they belong to. The system selects and loads the appropriate model for the identified trend, then uses this model to classify the data point. The classification process involves comparing the new data point against the expected pattern predicted by the model. If the data point deviates significantly from the expected pattern, it is classified as an anomaly When an anomaly is detected, the system generates an automated response. The response can vary depending on the nature and severity of the anomaly, ranging from simple alerts to complex remedial actions. Automated responses ensure that anomalies are addressed promptly and effectively, minimizing potential risks and losses. If no anomaly is detected, the process concludes without further action, allowing the system to continue monitoring and analyzing incoming data seamlessly.

The invention's hierarchical and cluster-based approach to anomaly detection ensures high accuracy and reliability. By leveraging multiple models to predict cumulative differences and focusing on significant deviations, the system can handle complex time series data with irregular trends effectively. The use of clustering and feature engineering enhances the system's ability to identify and analyze unique patterns within the data. This comprehensive approach not only improves anomaly detection but also provides valuable insights into the underlying trends and patterns within the data set.

Furthermore, the invention's ability to generate automated responses to detected anomalies ensures that any issues are addressed swiftly and efficiently. This prompt action is particularly important in environments where timely responses to anomalies are necessary to prevent significant disruptions or losses. The use of serialized models allows for efficient storage and retrieval, ensuring that the system can manage large volumes of data without compromising performance. Overall, this invention represents a substantial advancement in the field of anomaly detection in time series data.

In conclusion, the second aspect of the invention offers a detailed and robust solution for detecting anomalies in time series data disrupted by irregular trends. By utilizing a combination of real-time data logging, extraction, cleanup, feature engineering, hierarchical modeling, and clustering, the system achieves high accuracy and reliability in anomaly detection. The invention's comprehensive approach ensures that all relevant trends and patterns are identified and analyzed, providing valuable insights and prompt responses to any detected anomalies. This makes it a highly effective tool for managing and analyzing complex time series data sets in various applications, enhancing both the accuracy and efficiency of anomaly detection processes.

The hierarchical approach, involving multiple predictive models, allows the system to address the limitations of single-order models and capture even the smallest irregular trends. By clustering data into micro-clusters and focusing on significant deviations, the system ensures precise anomaly detection and effective automated responses. This detailed and robust framework makes the invention an indispensable tool for analyzing and managing complex time series data with irregular trends.

The invention also emphasizes the importance of scalability and adaptability. By designing a system that can handle large volumes of data and adapt to different types of time series data, the invention proves its versatility. The hierarchical models can be updated or replaced as new trends and patterns emerge, ensuring that the system remains effective over time. This adaptability is crucial for long-term anomaly detection and trend analysis.

Moreover, the use of advanced machine learning techniques ensures that the system can continuously improve its accuracy. By learning from past data and refining its models, the system can adapt to new anomalies and trends more effectively. This continuous learning capability is a significant advantage, making the system robust against evolving data patterns and ensuring that it remains relevant and accurate in the long run.

In addition to its technical capabilities, the invention also provides a user-friendly interface for monitoring and managing anomalies. This interface allows users to easily visualize trends, identify anomalies, and respond to alerts. The interface is designed to be intuitive, making it accessible to users with varying levels of technical expertise. This ease of use is an important aspect, ensuring that the system can be effectively utilized across different industries and applications.

In summary, the second aspect of the invention offers a comprehensive, adaptable, and highly accurate solution for anomaly detection in time series data. By leveraging a combination of real-time data logging, meticulous data processing, hierarchical modeling, and advanced machine learning techniques, the system provides robust and reliable anomaly detection. Its ability to handle complex and irregular data patterns, coupled with its user-friendly interface, makes it a powerful tool for managing and analyzing time series data in various applications. This invention represents a significant advancement in the field of anomaly detection, offering a detailed and effective approach to understanding and responding to complex data trends.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

On the first aspect of the invention, in some arrangements a method for detecting anomalies in time series data exhibiting irregular trends comprises several steps. First, data is collected at a data inception point using a data collection module, ensuring comprehensive data capture from various sources, including but not limited to IoT devices, transaction logs, and sensor networks. The collected data is logged in real-time using a real-time logging tool to maintain temporal integrity and allow for accurate sequence analysis, capturing every data point with timestamps to ensure continuity. Relevant data is extracted from the logged data by filtering and isolating key data points necessary for further analysis using an extraction module. This involves removing redundant or irrelevant data entries and focusing on critical metrics.

Preliminary analysis is performed on the extracted data with an analysis module to identify any obvious patterns or anomalies and establish a baseline understanding, utilizing statistical methods and visual inspections to detect initial irregularities. The extracted data is then cleaned using a data cleanup module to remove noise and irrelevant information, ensuring that the data used for feature engineering and analysis is accurate and reliable. This involves methods such as outlier removal, interpolation, and normalization. Features are engineered from the cleaned data by transforming raw data into a structured format that highlights significant attributes and properties for machine learning algorithms using a feature engineering module. This may include creating new variables, aggregating data points, and encoding categorical variables.

The engineered features are ingested into a storage and primary data source for organized and efficient retrieval using a data ingestion module, ensuring that the data is formatted and stored in a database or data warehouse for easy access. The stored data is retrieved for detailed trend analysis using sophisticated algorithms to detect regularities and irregularities with a data retrieval module, employing SQL queries or API calls to access specific datasets. Unique trends and patterns within the data are identified by analyzing temporal sequences and external influencers such as holidays or weekends using a trend analysis module. This involves applying time-series analysis techniques like moving averages, seasonal decomposition, and Fourier transforms.

The data is clustered based on identified trend influencers to categorize it into distinct segments representing different patterns using a clustering module. This can include methods such as K-means clustering, hierarchical clustering, or DBSCAN to group similar data points. A specific predictive model is developed for each identified trend cluster, tailored to recognize the unique characteristics of each segment using a model development module. This involves training machine learning models such as Random Forest, Gradient Boosting, or neural networks on each cluster. The predictive models are serialized for efficient storage and retrieval, ensuring that models can be easily accessed and applied to new data using a model serialization module. This utilizes formats like PMML (Predictive Model Markup Language) or ONNX (Open Neural Network Exchange) for portability.

New data points are classified to determine the relevant trend cluster by comparing them to historical data patterns using a classification module. This employs supervised learning algorithms to assign new data points to the correct cluster. The appropriate predictive model is selected and loaded for the classified data point based on the identified trend cluster using a model selection and loading module, ensuring the correct model is applied for anomaly detection. The classified data point is compared against the expected pattern predicted by the model to detect deviations using a comparison module. This involves calculating residuals and applying threshold criteria to identify anomalies.

If the data point is determined to be an anomaly based on the comparison, significant deviations from expected patterns are identified using an anomaly detection module. This may involve statistical tests, machine learning classifiers, or ensemble methods. An automated response is generated if an anomaly is detected, which may include sending alerts or initiating remedial actions using an automated response module. This provides notifications via email, SMS, or system logs, and triggers automated workflows or corrective actions. If no anomaly is detected, the process concludes without further action, allowing the system to continue monitoring and analyzing incoming data using a monitoring module. This ensures continuous surveillance and anomaly detection capabilities.

The data stream is logged in real-time using a logging tool to ensure accurate temporal data capture, maintaining a comprehensive log of all data interactions and transformations. Data analysis is performed using an analysis module to interpret the logged data and extract meaningful insights, applying advanced statistical and machine learning techniques to uncover hidden patterns and trends. Data cleanup is implemented to remove any irrelevant or noisy data using a data cleanup module, ensuring that the dataset is pristine for further processing. This may involve techniques such as data smoothing, normalization, and imputation of missing values.

Feature engineering is conducted using a feature engineering module to identify and create relevant data features that highlight significant attributes for machine learning algorithms. This involves domain-specific transformations and the creation of interaction terms. The cleaned and engineered data is ingested into a primary storage source using a data ingestion module, organizing the data for efficient access and retrieval. This ensures compatibility with big data frameworks like Hadoop or Spark. The ingested data is retrieved for detailed trend analysis using a data retrieval module, applying sophisticated algorithms to detect regularities and irregularities. This includes advanced techniques such as wavelet transforms or dynamic time warping.

Trend analysis is performed using a trend analysis module to identify unique trends and patterns within the data, including the influence of external factors such as holidays and weekends. This employs decomposition methods like STL (Seasonal and Trend decomposition using Loess) or ARIMA (AutoRegressive Integrated Moving Average). The identified trends are clustered using a clustering module to categorize the data into distinct segments representing different patterns and influencers. This ensures robust grouping through algorithms like Gaussian Mixture Models or spectral clustering.

Pattern-specific predictive models are developed for each trend cluster using a model development module. The models are tailored to recognize the unique characteristics of each segment, utilizing state-of-the-art machine learning frameworks like TensorFlow or PyTorch. The developed predictive models are serialized using a model serialization module for efficient storage and retrieval, ensuring easy application to new data. Serialization formats that support cross-platform deployment and scalability are employed.

Incoming data points are classified to determine their relevant trend cluster using a classification module. These points are compared to historical data patterns, ensuring accurate classification through techniques like nearest neighbors or support vector machines. The appropriate predictive model for the classified data point is selected and loaded using a model selection and loading module. This ensures accurate model application by dynamically selecting the best-fit model based on real-time data characteristics. The classified data point is compared against the expected pattern predicted by the model using a comparison module. Deviations are detected through robust statistical tests and anomaly detection algorithms.

If the classified data point is determined to be an anomaly based on the comparison, significant deviations from expected patterns are identified using an anomaly detection module. Ensemble methods are employed to enhance detection accuracy. If an anomaly is detected, an automated response is generated using an automated response module. This may include sending alerts or initiating remedial actions, ensuring swift and effective responses through integration with automated incident management systems. If no anomaly is detected, the process concludes without further action, allowing the system to continue real-time monitoring and analysis using a monitoring module. This maintains a seamless flow of data surveillance and anomaly detection.

Trend analysis and clustering are implemented to continuously update and refine models based on the latest data patterns and trends. This ensures the system's adaptability and accuracy over time, leveraging continuous learning algorithms to keep the models current and effective.

In some arrangements, a method for detecting anomalies in time series data exhibiting irregular trends comprises several steps. Data is collected at a data inception point using a data collection module, ensuring comprehensive data capture from various sources. The collected data is logged in real-time using a real-time logging tool to maintain temporal integrity and allow for accurate sequence analysis. Relevant data is extracted from the logged data by filtering and isolating key data points necessary for further analysis using an extraction module. Preliminary analysis is performed on the extracted data with an analysis module to identify any obvious patterns or anomalies and establish a baseline understanding. The extracted data is then cleaned using a data cleanup module to remove noise and irrelevant information, ensuring that the data used for feature engineering and analysis is accurate and reliable. This involves methods such as outlier removal, interpolation, and normalization.

Features are engineered from the cleaned data by transforming raw data into a structured format that highlights significant attributes and properties for machine learning algorithms using a feature engineering module. The engineered features are ingested into a storage and primary data source for organized and efficient retrieval using a data ingestion module. The stored data is retrieved for detailed trend analysis using sophisticated algorithms to detect regularities and irregularities with a data retrieval module. Unique trends and patterns within the data are identified by analyzing temporal sequences and external influencers such as holidays or weekends using a trend analysis module. This involves applying time-series analysis techniques like moving averages, seasonal decomposition, and Fourier transforms.

The data is clustered based on identified trend influencers to categorize it into distinct segments representing different patterns using a clustering module. A specific predictive model is developed for each identified trend cluster, tailored to recognize the unique characteristics of each segment using a model development module. The predictive models are serialized for efficient storage and retrieval, ensuring that models can be easily accessed and applied to new data using a model serialization module. New data points are classified to determine the relevant trend cluster by comparing them to historical data patterns using a classification module. The appropriate predictive model is selected and loaded for the classified data point based on the identified trend cluster using a model selection and loading module, ensuring the correct model is applied for anomaly detection. The classified data point is compared against the expected pattern predicted by the model to detect deviations using a comparison module. This involves calculating residuals and applying threshold criteria to identify anomalies.

If the data point is determined to be an anomaly based on the comparison, significant deviations from expected patterns are identified using an anomaly detection module. An automated response is generated if an anomaly is detected, which may include sending alerts or initiating remedial actions using an automated response module. If no anomaly is detected, the process concludes without further action, allowing the system to continue monitoring and analyzing incoming data using a monitoring module. This ensures continuous surveillance and anomaly detection capabilities.

In some arrangements, the method further comprises the step of filtering the collected data to isolate the most pertinent information before logging, using a data filtering module. In some arrangements, the preliminary analysis includes identifying any apparent patterns or anomalies in the extracted data, using an initial pattern recognition module. In some arrangements, the cleaning step involves removing random fluctuations and extraneous elements from the extracted data, using a noise reduction module.

In some arrangements, the feature engineering step includes transforming raw data into a structured format that highlights underlying patterns and trends, using a feature transformation module. In some arrangements, the trend analysis step involves using sophisticated algorithms to detect regularities and irregularities in the data over time, using an advanced trend detection module. In some arrangements, clustering the data includes categorizing the data into segments based on specific events such as holidays, weekends, or other non-periodic occurrences, using a data segmentation module.

In some arrangements, developing a specific predictive model for each trend cluster involves creating models that recognize the unique characteristics of each cluster based on historical data, using a historical pattern modeling module. In some arrangements, the step of generating an automated response includes sending alerts or initiating remedial actions based on the nature and severity of the detected anomaly, using an alert generation and action module. In some arrangements, the step of serializing the predictive models further includes storing the models in a structured format that allows for efficient retrieval and application to new data, using a model serialization and storage module.

In some arrangements, a system for detecting anomalies in time series data exhibiting irregular trends comprises several components. A data collection module is configured to collect data at a data inception point, ensuring comprehensive data capture from various sources, including but not limited to IoT devices, transaction logs, and sensor networks. A real-time logging tool is configured to log the collected data in real-time, maintaining temporal integrity and allowing for accurate sequence analysis by capturing every data point with timestamps. An extraction module is configured to filter and isolate relevant data from the logged data, necessary for further analysis by removing redundant or irrelevant data entries and focusing on critical metrics.

An analysis module is configured to perform preliminary analysis on the extracted data, identifying any obvious patterns or anomalies and establishing a baseline understanding using statistical methods and visual inspections. A data cleanup module is configured to remove noise and irrelevant information from the extracted data, ensuring that the data used for feature engineering and analysis is accurate and reliable through methods such as outlier removal, interpolation, and normalization. A feature engineering module is configured to transform raw data into a structured format that highlights significant attributes and properties for machine learning algorithms by creating new variables, aggregating data points, and encoding categorical variables.

A data ingestion module is configured to ingest the engineered features into a storage and primary data source for organized and efficient retrieval, ensuring the data is formatted and stored in a database or data warehouse for easy access. A data retrieval module is configured to retrieve the stored data for detailed trend analysis using sophisticated algorithms to detect regularities and irregularities, employing SQL queries or API calls to access specific datasets. A trend analysis module is configured to identify unique trends and patterns within the data by analyzing temporal sequences and external influencers such as holidays or weekends using time-series analysis techniques like moving averages, seasonal decomposition, and Fourier transforms.

A clustering module is configured to categorize the data into distinct segments representing different patterns based on identified trend influencers using clustering methods such as K-means clustering, hierarchical clustering, or DBSCAN. A model development module is configured to develop a specific predictive model for each identified trend cluster, tailored to recognize the unique characteristics of each segment by training machine learning models such as Random Forest, Gradient Boosting, or neural networks. A model serialization module is configured to serialize the predictive models for efficient storage and retrieval, ensuring that models can be easily accessed and applied to new data using formats like PMML (Predictive Model Markup Language) or ONNX (Open Neural Network Exchange).

A classification module is configured to classify new data points to determine the relevant trend cluster by comparing them to historical data patterns using supervised learning algorithms. A model selection and loading module is configured to select and load the appropriate predictive model for the classified data point based on the identified trend cluster, ensuring accurate model application. A comparison module is configured to compare the classified data point against the expected pattern predicted by the model to detect deviations, involving calculating residuals and applying threshold criteria to identify anomalies.

An anomaly detection module is configured to determine whether the data point is an anomaly based on the comparison, identifying significant deviations from expected patterns using statistical tests, machine learning classifiers, or ensemble methods. An automated response module is configured to generate an automated response if an anomaly is detected, which may include sending alerts or initiating remedial actions via email, SMS, or system logs, and triggering automated workflows or corrective actions. A monitoring module is configured to conclude the process without further action if no anomaly is detected, allowing the system to continue monitoring and analyzing incoming data in real-time, ensuring continuous surveillance and anomaly detection capabilities.

In some arrangements, the data collection module is further configured to collect data from IoT devices, transaction logs, and sensor networks, ensuring comprehensive data capture from multiple and diverse sources to provide a holistic view of the system's environment. In some arrangements, the extraction module is further configured to remove redundant or irrelevant data entries and focus on critical metrics for analysis, using advanced filtering techniques and criteria to enhance the quality and relevance of the extracted data. In some arrangements, the data cleanup module is further configured to perform outlier removal, interpolation, and normalization to refine the data, ensuring that the dataset is pristine and ready for feature engineering by addressing any inconsistencies or gaps in the data.

In some arrangements, the feature engineering module is further configured to create new variables, aggregate data points, and encode categorical variables to enhance the data for machine learning algorithms, leveraging domain-specific transformations and interactions to extract the most meaningful features. In some arrangements, the trend analysis module is further configured to apply time-series analysis techniques such as moving averages, seasonal decomposition, and Fourier transforms to detect unique trends, enabling the system to accurately identify and characterize patterns over time. In some arrangements, the clustering module is further configured to use clustering methods such as K-means clustering, hierarchical clustering, or DBSCAN to group similar data points, facilitating the identification of distinct patterns and trends within the data.

In some arrangements, the model development module is further configured to train machine learning models such as Random Forest, Gradient Boosting, or neural networks on each identified trend cluster, ensuring that each model is tailored to the unique characteristics of its respective cluster for optimal predictive accuracy. In some arrangements, the automated response module is further configured to send alerts via email, SMS, or system logs, and trigger automated workflows or corrective actions based on the nature and severity of the detected anomaly, ensuring swift and effective responses to potential issues.

On the second aspect of the invention, a method for detecting anomalies in time series data exhibiting irregular trends comprises several steps. Data is collected at a data inception point using a data collection module, ensuring comprehensive data capture from various sources, including IoT devices, transaction logs, and sensor networks, thus ensuring a wide variety of data inputs for robust analysis. The collected data is logged in real-time using a real-time logging tool to maintain temporal integrity and allow for accurate sequence analysis, capturing every data point with precise timestamps to create a reliable time series. Relevant data is extracted from the logged data by filtering and isolating key data points necessary for further analysis using an extraction module, which involves removing redundant or irrelevant data entries and focusing on critical metrics such as transaction amounts, device activity levels, and sensor readings.

Preliminary analysis is performed on the extracted data with an analysis module to identify any obvious patterns or anomalies and establish a baseline understanding, using statistical methods like mean, median, standard deviation, and visual inspections through graphs and charts. The extracted data is then cleaned using a data cleanup module to remove noise and irrelevant information, ensuring that the data used for feature engineering and analysis is accurate and reliable. This involves methods such as outlier removal, interpolation to fill missing values, and normalization to standardize data scales. Features are engineered from the cleaned data by transforming raw data into a structured format that highlights significant attributes and properties for machine learning algorithms using a feature engineering module. This includes creating new variables, aggregating data points, and encoding categorical variables into numerical format.

The engineered features are ingested into a storage and primary data source for organized and efficient retrieval using a data ingestion module, ensuring that the data is formatted and stored in a database or data warehouse for easy access and retrieval. The stored data is retrieved for detailed trend analysis using sophisticated algorithms to detect regularities and irregularities with a data retrieval module, employing SQL queries or API calls to access specific datasets efficiently. Unique trends and patterns within the data are identified by analyzing temporal sequences and external influencers such as holidays or weekends using a trend analysis module, applying time-series analysis techniques like moving averages, seasonal decomposition, and Fourier transforms to uncover hidden patterns. The data is clustered based on identified trend influencers to categorize it into distinct segments representing different patterns using a clustering module. This can include methods such as K-means clustering, hierarchical clustering, or DBSCAN to group similar data points. A first-order predictive model is developed to predict the general trend or specific value within the data using a model development module, training machine learning models such as linear regression or ARIMA to capture the overall trend. A second-order predictive model is developed to predict the differences identified by the first-order model using a second-order model development module, employing more complex models such as Random Forest or Gradient Boosting to capture residual patterns.

Hierarchical modeling continues with higher-order models to successively predict the residuals left by previous models using higher-order model development modules, ensuring that even small irregular trends are captured accurately by iterative refinements. The predictive models are serialized for efficient storage and retrieval, ensuring that models can be easily accessed and applied to new data using a model serialization module. This utilizes formats like PMML (Predictive Model Markup Language) or ONNX (Open Neural Network Exchange) to facilitate interoperability. New data points are classified to determine the relevant trend cluster by comparing them to historical data patterns using a classification module, employing supervised learning algorithms such as decision trees or support vector machines to assign new data points to the correct cluster.

The appropriate predictive model is selected and loaded for the classified data point based on the identified trend cluster using a model selection and loading module, ensuring the correct model is applied for anomaly detection by dynamically linking data points with their respective models. The classified data point is compared against the expected pattern predicted by the model to detect deviations using a comparison module, involving calculating residuals, deviations, and applying threshold criteria to identify anomalies. If the data point is determined to be an anomaly based on the comparison, significant deviations from expected patterns are identified using an anomaly detection module, which may involve statistical tests, machine learning classifiers, or ensemble methods to ensure robust detection. An automated response is generated if an anomaly is detected, which may include sending alerts or initiating remedial actions using an automated response module, providing notifications via email, SMS, or system logs, and triggering automated workflows or corrective actions to mitigate potential issues. If no anomaly is detected, the process concludes without further action, allowing the system to continue monitoring and analyzing incoming data using a monitoring module, ensuring continuous surveillance and anomaly detection capabilities.

In some arrangements, the method further comprises the step of using advanced filtering techniques within the extraction module to remove redundant or irrelevant data entries. This enhances the quality and relevance of the extracted data by applying filters such as range checks, duplication removal, and significance tests. Some arrangements include the preliminary analysis utilizing statistical methods and visual inspections within the analysis module to identify initial irregularities in the extracted data. This provides an early indication of potential anomalies through techniques like histogram analysis, scatter plots, and time-series plotting.

In some arrangements, the data cleanup step involves performing outlier removal, interpolation, and normalization using the data cleanup module to refine the data. This ensures that the dataset is pristine and ready for feature engineering by addressing any inconsistencies or gaps in the data through methods such as Z-score filtering, linear interpolation, and min-max scaling. Some arrangements include the feature engineering step of creating new variables, aggregating data points, and encoding categorical variables using the feature engineering module. This enhances the data for machine learning algorithms, leveraging domain-specific transformations and interactions to extract the most meaningful features, such as time-based aggregations, one-hot encoding, and polynomial feature creation.

In some arrangements, the trend analysis step involves applying time-series analysis techniques such as moving averages, seasonal decomposition, and Fourier transforms using the trend analysis module to detect unique trends. This enables the system to accurately identify and characterize patterns over time, including techniques like exponential smoothing, STL decomposition, and frequency domain analysis. Some arrangements include clustering the data using clustering methods such as K-means clustering, hierarchical clustering, or DBSCAN within the clustering module. This groups similar data points, facilitating the identification of distinct patterns and trends within the data, and optimizing cluster parameters using methods like silhouette analysis, dendrograms, and density-based spatial clustering.

In some arrangements, the step of developing higher-order models involves using ensemble methods within the higher-order model development modules to enhance the accuracy and robustness of the predictive models. This ensures that even minor irregular trends are captured effectively by combining multiple models through techniques like bagging, boosting, and stacking. Some arrangements include the automated response step of sending alerts via email, SMS, or system logs, and triggering automated workflows or corrective actions using the automated response module. This ensures swift and effective responses to potential issues based on the nature and severity of the detected anomaly by integrating with incident management systems and automated resolution protocols.

In some arrangements, a method for detecting anomalies in time series data exhibiting irregular trends comprises several steps. Data is collected at a data inception point using a data collection module, ensuring comprehensive data capture from various sources including IoT devices, transaction logs, and sensor networks. The collected data is logged in real-time using a real-time logging tool to maintain temporal integrity and allow for accurate sequence analysis by capturing every data point with precise timestamps. Relevant data is extracted from the logged data by filtering and isolating key data points necessary for further analysis using an extraction module, which involves removing redundant or irrelevant data entries and focusing on critical metrics.

Preliminary analysis is performed on the extracted data with an analysis module to identify any obvious patterns or anomalies and establish a baseline understanding, using statistical methods and visual inspections. The extracted data is then cleaned using a data cleanup module to remove noise and irrelevant information, ensuring that the data used for feature engineering and analysis is accurate and reliable. This process involves methods such as outlier removal, interpolation to fill missing values, and normalization to standardize data scales. Features are engineered from the cleaned data by transforming raw data into a structured format that highlights significant attributes and properties for machine learning algorithms using a feature engineering module. This step includes creating new variables, aggregating data points, and encoding categorical variables into numerical format.

The engineered features are ingested into a storage and primary data source for organized and efficient retrieval using a data ingestion module, ensuring that the data is formatted and stored in a database or data warehouse for easy access. The stored data is retrieved for detailed trend analysis using sophisticated algorithms to detect regularities and irregularities with a data retrieval module, employing SQL queries or API calls to access specific datasets. Unique trends and patterns within the data are identified by analyzing temporal sequences and external influencers such as holidays or weekends using a trend analysis module, applying time-series analysis techniques like moving averages, seasonal decomposition, and Fourier transforms.

The data is clustered based on identified trend influencers to categorize it into distinct segments representing different patterns using a clustering module. This can include methods such as K-means clustering, hierarchical clustering, or DBSCAN to group similar data points. A first-order predictive model is developed to predict the general trend or specific value within the data using a model development module, training machine learning models such as linear regression or ARIMA. A second-order predictive model is developed to predict the differences identified by the first-order model using a second-order model development module, employing more complex models such as Random Forest or Gradient Boosting.

Hierarchical modeling continues with higher-order models to successively predict the residuals left by previous models using higher-order model development modules, ensuring that even small irregular trends are captured accurately by iterative refinements. The predictive models are serialized for efficient storage and retrieval, ensuring that models can be easily accessed and applied to new data using a model serialization module. This step utilizes formats like PMML (Predictive Model Markup Language) or ONNX (Open Neural Network Exchange) to facilitate interoperability. New data points are classified to determine the relevant trend cluster by comparing them to historical data patterns using a classification module, employing supervised learning algorithms such as decision trees or support vector machines to assign new data points to the correct cluster.

The appropriate predictive model is selected and loaded for the classified data point based on the identified trend cluster using a model selection and loading module, ensuring the correct model is applied for anomaly detection by dynamically linking data points with their respective models. The classified data point is compared against the expected pattern predicted by the model to detect deviations using a comparison module, involving calculating residuals and applying threshold criteria to identify anomalies. If the data point is determined to be an anomaly based on the comparison, significant deviations from expected patterns are identified using an anomaly detection module, which may involve statistical tests, machine learning classifiers, or ensemble methods to ensure robust detection. An automated response is generated if an anomaly is detected, which may include sending alerts or initiating remedial actions using an automated response module. This step involves providing notifications via email, SMS, or system logs, and triggering automated workflows or corrective actions to mitigate potential issues. If no anomaly is detected, the process concludes without further action, allowing the system to continue monitoring and analyzing incoming data using a monitoring module, ensuring continuous surveillance and anomaly detection capabilities.

In some arrangements, a system for detecting anomalies in time series data exhibiting irregular trends comprises several components. A data collection module is configured to collect data at a data inception point from various sources, including IoT devices, transaction logs, and sensor networks, ensuring comprehensive data capture to provide a diverse and holistic dataset. A real-time logging tool is configured to log the collected data in real-time, maintaining temporal integrity and allowing for accurate sequence analysis by capturing every data point with precise timestamps, ensuring the data is accurately recorded as it is generated. An extraction module is configured to filter and isolate relevant data from the logged data, necessary for further analysis by removing redundant or irrelevant data entries and focusing on critical metrics such as transaction amounts, device activity levels, and sensor readings.

An analysis module is configured to perform preliminary analysis on the extracted data, identifying any obvious patterns or anomalies and establishing a baseline understanding using statistical methods such as mean, median, and standard deviation, and visual inspections through graphs and charts. A data cleanup module is configured to remove noise and irrelevant information from the extracted data, ensuring that the data used for feature engineering and analysis is accurate and reliable. This involves methods such as outlier removal, interpolation to fill missing values, and normalization to standardize data scales. A feature engineering module is configured to transform raw data into a structured format that highlights significant attributes and properties for machine learning algorithms, including creating new variables, aggregating data points, and encoding categorical variables into numerical format.

A data ingestion module is configured to ingest the engineered features into a storage and primary data source for organized and efficient retrieval, ensuring that the data is formatted and stored in a database or data warehouse for easy access. A data retrieval module is configured to retrieve the stored data for detailed trend analysis using sophisticated algorithms to detect regularities and irregularities, employing SQL queries or API calls to access specific datasets efficiently. A trend analysis module is configured to identify unique trends and patterns within the data by analyzing temporal sequences and external influencers such as holidays or weekends, applying time-series analysis techniques like moving averages, seasonal decomposition, and Fourier transforms to uncover hidden patterns.

A clustering module is configured to categorize the data into distinct segments representing different patterns based on identified trend influencers, using clustering methods such as K-means clustering, hierarchical clustering, or DBSCAN to group similar data points. A first-order model development module is configured to develop a first-order predictive model to predict the general trend or specific value within the data, training machine learning models such as linear regression or ARIMA. A second-order model development module is configured to develop a second-order predictive model to predict the differences identified by the first-order model, employing more complex models such as Random Forest or Gradient Boosting.

Higher-order model development modules are configured to continue hierarchical modeling with higher-order models to successively predict the residuals left by previous models, ensuring that even small irregular trends are captured accurately by iterative refinements. A model serialization module is configured to serialize the predictive models for efficient storage and retrieval, ensuring that models can be easily accessed and applied to new data, utilizing formats like PMML (Predictive Model Markup Language) or ONNX (Open Neural Network Exchange) to facilitate interoperability. A classification module is configured to classify new data points to determine the relevant trend cluster by comparing them to historical data patterns, employing supervised learning algorithms such as decision trees or support vector machines to assign new data points to the correct cluster.

A model selection and loading module is configured to select and load the appropriate predictive model for the classified data point based on the identified trend cluster, ensuring the correct model is applied for anomaly detection by dynamically linking data points with their respective models. A comparison module is configured to compare the classified data point against the expected pattern predicted by the model to detect deviations, involving calculating residuals and applying threshold criteria to identify anomalies. An anomaly detection module is configured to determine whether the data point is an anomaly based on the comparison, identifying significant deviations from expected patterns using statistical tests, machine learning classifiers, or ensemble methods to ensure robust detection. An automated response module is configured to generate an automated response if an anomaly is detected, which may include sending alerts or initiating remedial actions. This involves providing notifications via email, SMS, or system logs, and triggering automated workflows or corrective actions to mitigate potential issues. If no anomaly is detected, a monitoring module is configured to conclude the process without further action, allowing the system to continue monitoring and analyzing incoming data in real-time, ensuring continuous surveillance and anomaly detection capabilities.

In some arrangements, the data collection module is further configured to collect data from diverse sources such as social media feeds, weather sensors, and financial market data, ensuring an enriched dataset for comprehensive analysis. In some arrangements, the extraction module is further configured to apply advanced filtering techniques to remove redundant or irrelevant data entries, enhancing the quality and relevance of the extracted data by applying filters such as range checks, duplication removal, and significance tests. In some arrangements, the analysis module is further configured to utilize statistical methods and visual inspections to identify initial irregularities in the extracted data, providing an early indication of potential anomalies through techniques like histogram analysis, scatter plots, and time-series plotting.

In some arrangements, the data cleanup module is further configured to perform outlier removal, interpolation, and normalization to refine the data, ensuring that the dataset is pristine and ready for feature engineering by addressing any inconsistencies or gaps in the data through methods such as Z-score filtering, linear interpolation, and min-max scaling. In some arrangements, the feature engineering module is further configured to create new variables, aggregate data points, and encode categorical variables into numerical format, leveraging domain-specific transformations and interactions to extract the most meaningful features, such as time-based aggregations, one-hot encoding, and polynomial feature creation. In some arrangements, the trend analysis module is further configured to apply time-series analysis techniques such as moving averages, seasonal decomposition, and Fourier transforms to detect unique trends, enabling the system to accurately identify and characterize patterns over time, including techniques like exponential smoothing, STL decomposition, and frequency domain analysis.

In some arrangements, the clustering module is further configured to use clustering methods such as K-means clustering, hierarchical clustering, or DBSCAN to group similar data points, facilitating the identification of distinct patterns and trends within the data, and optimizing cluster parameters using methods like silhouette analysis, dendrograms, and density-based spatial clustering. In some arrangements, the higher-order model development modules are further configured to use ensemble methods to enhance the accuracy and robustness of the predictive models, ensuring that even minor irregular trends are captured effectively by combining multiple models through techniques like bagging, boosting, and stacking. In some arrangements, the automated response module is further configured to send alerts via email, SMS, or system logs, and trigger automated workflows or corrective actions based on the nature and severity of the detected anomaly, ensuring swift and effective responses to potential issues by integrating with incident management systems and automated resolution protocols.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

DETAILED DESCRIPTION

Figure 1:
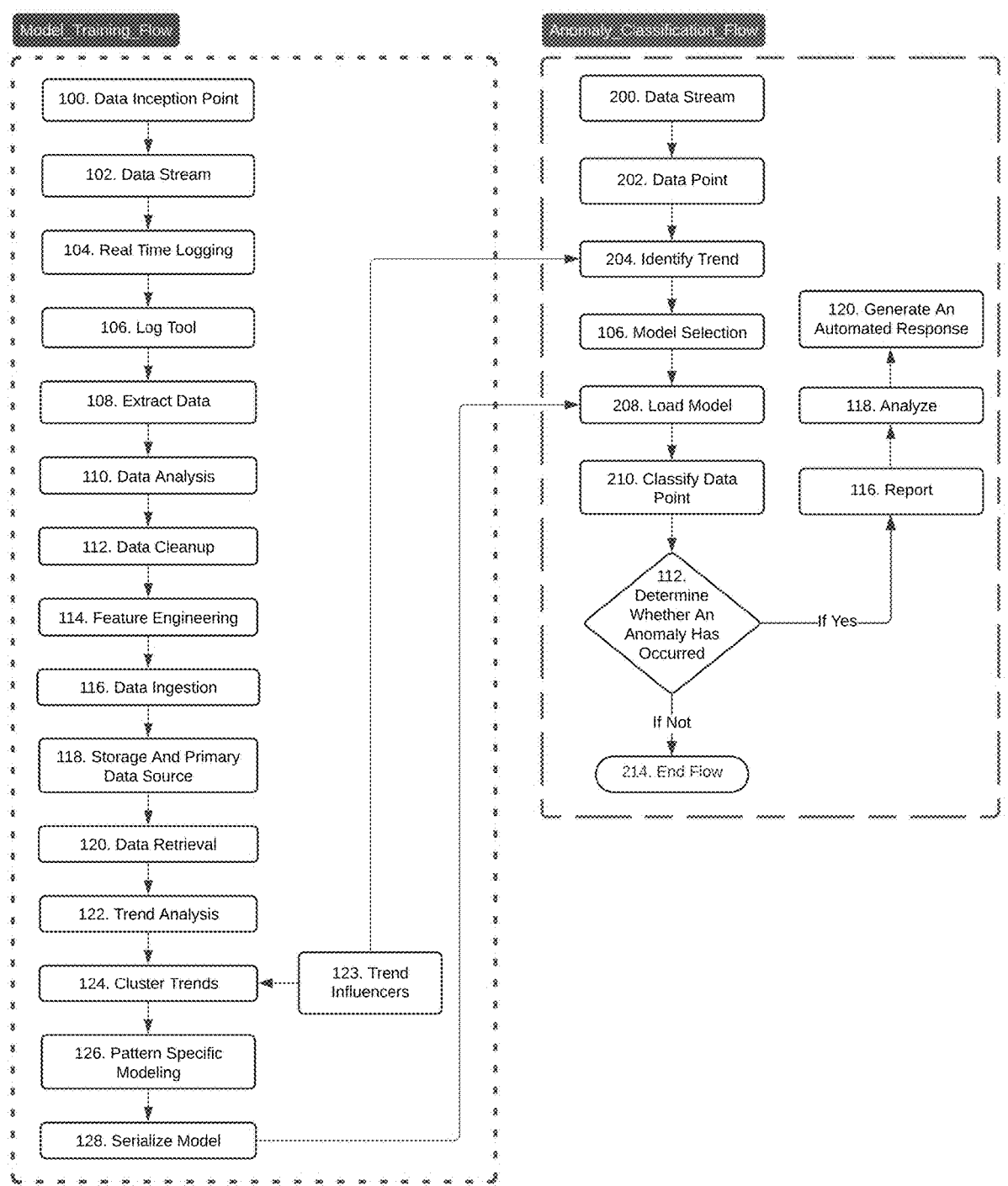
FIG. 1 is technical flow diagram outlines a comprehensive process for model training and anomaly detection in time series data, involving data collection, real-time logging, extraction, cleaning, feature engineering, trend analysis, and model development. It ensures accurate anomaly classification and timely automated responses by leveraging advanced machine learning techniques and structured data processing workflows.

As a brief overview, the first invention involves a sophisticated system and method for detecting anomalies in time series data exhibiting irregular trends. This invention begins with the collection of data at a data inception point using a data collection module, ensuring comprehensive data capture from various sources such as IoT devices, transaction logs, and sensor networks. The collected data is logged in real-time using a real-time logging tool, maintaining temporal integrity and allowing for accurate sequence analysis by capturing every data point with precise timestamps. Relevant data is then extracted from the logged data by filtering and isolating key data points necessary for further analysis using an extraction module, which involves removing redundant or irrelevant data entries and focusing on critical metrics.

Preliminary analysis is performed on the extracted data with an analysis module to identify any obvious patterns or anomalies and establish a baseline understanding, using statistical methods and visual inspections. The extracted data is cleaned using a data cleanup module to remove noise and irrelevant information, ensuring that the data used for feature engineering and analysis is accurate and reliable. This cleaning process involves methods such as outlier removal, interpolation to fill missing values, and normalization to standardize data scales. Features are then engineered from the cleaned data by transforming raw data into a structured format that highlights significant attributes and properties for machine learning algorithms using a feature engineering module. This includes creating new variables, aggregating data points, and encoding categorical variables into numerical format.

The engineered features are ingested into a storage and primary data source for organized and efficient retrieval using a data ingestion module, ensuring that the data is formatted and stored in a database or data warehouse for easy access. The stored data is retrieved for detailed trend analysis using sophisticated algorithms to detect regularities and irregularities with a data retrieval module, employing SQL queries or API calls to access specific datasets. Unique trends and patterns within the data are identified by analyzing temporal sequences and external influencers such as holidays or weekends using a trend analysis module, applying time-series analysis techniques like moving averages, seasonal decomposition, and Fourier transforms.

The data is clustered based on identified trend influencers to categorize it into distinct segments representing different patterns using a clustering module, which can include methods such as K-means clustering, hierarchical clustering, or DBSCAN to group similar data points. A specific predictive model is developed for each identified trend cluster, tailored to recognize the unique characteristics of each segment using a model development module, involving training machine learning models such as Random Forest, Gradient Boosting, or neural networks on each cluster. The predictive models are serialized for efficient storage and retrieval, ensuring that models can be easily accessed and applied to new data using a model serialization module, utilizing formats like PMML (Predictive Model Markup Language) or ONNX (Open Neural Network Exchange) for portability.

New data points are classified to determine the relevant trend cluster by comparing them to historical data patterns using a classification module, employing supervised learning algorithms to assign new data points to the correct cluster. The appropriate predictive model is selected and loaded for the classified data point based on the identified trend cluster using a model selection and loading module, ensuring the correct model is applied for anomaly detection. The classified data point is compared against the expected pattern predicted by the model to detect deviations using a comparison module, involving calculating residuals and applying threshold criteria to identify anomalies.

If the data point is determined to be an anomaly based on the comparison, significant deviations from expected patterns are identified using an anomaly detection module, which may involve statistical tests, machine learning classifiers, or ensemble methods. An automated response is generated if an anomaly is detected, which may include sending alerts or initiating remedial actions using an automated response module. This step involves providing notifications via email, SMS, or system logs, and triggering automated workflows or corrective actions to mitigate potential issues. If no anomaly is detected, the process concludes without further action, allowing the system to continue monitoring and analyzing incoming data using a monitoring module, ensuring continuous surveillance and anomaly detection capabilities.

The second invention builds on the first with additional layers of complexity and refinement. This invention also starts with data collection at a data inception point, using a data collection module to gather comprehensive data from diverse sources including IoT devices, transaction logs, and sensor networks. The data is logged in real-time using a real-time logging tool to ensure temporal integrity and accurate sequence analysis, capturing every data point with precise timestamps.

Relevant data is extracted from the logged data using an extraction module, which filters and isolates key data points necessary for further analysis by removing redundant or irrelevant data entries and focusing on critical metrics such as transaction amounts, device activity levels, and sensor readings. Preliminary analysis is performed on the extracted data using an analysis module to identify any obvious patterns or anomalies and establish a baseline understanding. This involves statistical methods like mean, median, standard deviation, and visual inspections through graphs and charts.

The extracted data is cleaned using a data cleanup module to remove noise and irrelevant information, ensuring the data used for feature engineering and analysis is accurate and reliable. This process involves methods such as outlier removal, interpolation to fill missing values, and normalization to standardize data scales. Features are engineered from the cleaned data by transforming raw data into a structured format that highlights significant attributes and properties for machine learning algorithms using a feature engineering module. This step includes creating new variables, aggregating data points, and encoding categorical variables into numerical format.

The engineered features are ingested into a storage and primary data source for organized and efficient retrieval using a data ingestion module, ensuring that the data is formatted and stored in a database or data warehouse for easy access. The stored data is retrieved for detailed trend analysis using sophisticated algorithms to detect regularities and irregularities with a data retrieval module, employing SQL queries or API calls to access specific datasets. Unique trends and patterns within the data are identified by analyzing temporal sequences and external influencers such as holidays or weekends using a trend analysis module, applying time-series analysis techniques like moving averages, seasonal decomposition, and Fourier transforms.

The data is clustered based on identified trend influencers to categorize it into distinct segments representing different patterns using a clustering module, which can include methods such as K-means clustering, hierarchical clustering, or DBSCAN to group similar data points. First-order predictive models are developed to predict the general trend or specific value within the data using a model development module, training machine learning models such as linear regression or ARIMA. Second-order predictive models are developed to predict the differences identified by the first-order models using a second-order model development module, employing more complex models such as Random Forest or Gradient Boosting.

Hierarchical modeling continues with higher-order models to successively predict the residuals left by previous models using higher-order model development modules, ensuring that even small irregular trends are captured accurately by iterative refinements. The predictive models are serialized for efficient storage and retrieval, ensuring that models can be easily accessed and applied to new data using a model serialization module. This step utilizes formats like PMML (Predictive Model Markup Language) or ONNX (Open Neural Network Exchange) to facilitate interoperability.

New data points are classified to determine the relevant trend cluster by comparing them to historical data patterns using a classification module, employing supervised learning algorithms such as decision trees or support vector machines to assign new data points to the correct cluster. The appropriate predictive model is selected and loaded for the classified data point based on the identified trend cluster using a model selection and loading module, ensuring the correct model is applied for anomaly detection by dynamically linking data points with their respective models.

The classified data point is compared against the expected pattern predicted by the model to detect deviations using a comparison module, involving calculating residuals and applying threshold criteria to identify anomalies. If the data point is determined to be an anomaly based on the comparison, significant deviations from expected patterns are identified using an anomaly detection module, which may involve statistical tests, machine learning classifiers, or ensemble methods to ensure robust detection. An automated response is generated if an anomaly is detected, which may include sending alerts or initiating remedial actions using an automated response module. This involves providing notifications via email, SMS, or system logs, and triggering automated workflows or corrective actions to mitigate potential issues. If no anomaly is detected, a monitoring module concludes the process without further action, allowing the system to continue monitoring and analyzing incoming data in real-time, ensuring continuous surveillance and anomaly detection capabilities.

The first and second inventions can be combined or altered to leverage components from each other, enhancing their overall effectiveness and versatility for various applications. Both inventions share a core framework of data collection, logging, extraction, analysis, cleanup, feature engineering, ingestion, retrieval, trend analysis, clustering, predictive modeling, classification, comparison, anomaly detection, and automated response. By integrating and adjusting these components, a more robust and adaptable system can be created.

For instance, the data collection module from the second invention, which gathers data from diverse sources such as IoT devices, transaction logs, social media feeds, weather sensors, and financial market data, can be integrated into the first invention to provide a more enriched and comprehensive dataset. This integration would enhance the data's diversity, leading to more robust analysis and anomaly detection.

The advanced filtering techniques used in the extraction module of the second invention can be applied to the first invention to improve the quality and relevance of the extracted data. By incorporating range checks, duplication removal, and significance tests, the system can ensure that only the most pertinent data points are analyzed, reducing noise and increasing the accuracy of anomaly detection.

The data cleanup module from the second invention, which performs outlier removal, interpolation, and normalization using methods such as Z-score filtering, linear interpolation, and min-max scaling, can be used to enhance the data preprocessing in the first invention. This would ensure that the dataset is pristine and ready for feature engineering, addressing any inconsistencies or gaps in the data more effectively.

Feature engineering in the first invention can be enhanced by incorporating the creation of new variables, aggregation of data points, and encoding of categorical variables into numerical format from the second invention. Leveraging domain-specific transformations and interactions, such as time-based aggregations, one-hot encoding, and polynomial feature creation, can extract the most meaningful features for machine learning algorithms, improving the system's predictive accuracy.

The trend analysis module from the second invention, which applies sophisticated time-series analysis techniques such as moving averages, seasonal decomposition, and Fourier transforms, can be integrated into the first invention to enable more accurate identification and characterization of patterns over time. Techniques like exponential smoothing, STL decomposition, and frequency domain analysis can further refine the trend analysis process.

Clustering methods such as K-means clustering, hierarchical clustering, or DBSCAN from the second invention can be used in the first invention to group similar data points, facilitating the identification of distinct patterns and trends. Optimizing cluster parameters using methods like silhouette analysis, dendrograms, and density-based spatial clustering can enhance the clustering process.

The higher-order model development modules from the second invention, which use ensemble methods to enhance the accuracy and robustness of predictive models, can be applied to the first invention. Combining multiple models through techniques like bagging, boosting, and stacking can ensure that even minor irregular trends are captured effectively, improving the system's overall predictive performance.

Finally, the automated response module from the second invention, which sends alerts via email, SMS, or system logs, and triggers automated workflows or corrective actions based on the nature and severity of the detected anomaly, can be integrated into the first invention. This would ensure swift and effective responses to potential issues by integrating with incident management systems and automated resolution protocols, enhancing the system's real-time monitoring and anomaly detection capabilities.

By combining and altering these components, the inventions can be tailored to meet specific application needs, providing a flexible and powerful system for detecting anomalies in time series data across various domains. The bottom line is that aspects of one invention or embodiment can be utilized in conjunction with aspects of the other inventions or embodiments as desired. Mere reference to first invention and second invention is simply to identify sample inventive embodiments, but skilled artisans will readily understand that they are interchangeable and combinable.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise Generative AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models—Meta LLaMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models—Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

FIG. 1, by way of non-limiting disclosure, depicts a technical flow diagram for model training and anomaly classification in time series data involves several detailed and interconnected steps to ensure the accurate detection of anomalies. Each step in the process leverages specific components designed to handle various aspects of data processing, from collection to analysis and anomaly detection.

The process for the Model Training Flow is as follows. Step 100: Data Inception Point—The process begins at Step 100, the Data Inception Point. Here, a Data Collection Module is employed to gather comprehensive data from diverse sources such as IoT devices, transaction logs, and sensor networks. This module ensures that the dataset is robust and extensive, capturing a wide range of operational contexts and conditions. The data collection module is designed to interface with multiple data sources, ensuring that no relevant data is overlooked. It uses APIs, direct database connections, and streaming data interfaces to collect real-time and batch data.

Step 102: Data Stream—In Step 102, the collected data flows through a real-time stream, facilitated by a Data Streaming Module. This module is responsible for the timely processing and analysis of incoming data. It ensures that data is processed as it is collected, maintaining its relevance and integrity. Real-time streaming is crucial for applications that require immediate insights, such as fraud detection or predictive maintenance. The module uses technologies like Apache Kafka or Apache Flink to manage high-throughput data streams efficiently.

Step 104: Real-Time Logging—Once collected, the data is logged in real-time (Step 104) using a Real-Time Logging Tool. This tool captures every data point with precise timestamps, preserving the temporal integrity of the data and ensuring accurate sequence analysis. The logging tool employs distributed logging systems like ELK Stack (Elasticsearch, Logstash, Kibana) or Splunk to handle large volumes of log data, ensuring that the data remains continuous and unbroken, which is crucial for subsequent analysis phases that rely on time-based patterns.

Step 106: Log Tool—In Step 106, the Log Tool ensures that the logging process is managed efficiently. This tool monitors the log streams, indexes the data for quick retrieval, and handles log rotation and archiving to manage storage effectively. It integrates with monitoring systems to alert administrators about any issues with the logging process.

Step 108: Extract Data—The logged data then moves to Step 108, where an Extraction Module filters out redundant or irrelevant entries, focusing only on critical metrics necessary for further analysis. This module enhances the efficiency and accuracy of subsequent analyses by isolating pertinent data. It uses techniques such as filtering, aggregation, and data transformation to preprocess the data. Tools like Apache NiFi or custom ETL (Extract, Transform, Load) scripts can be used for this purpose.

Step 110: Data Analysis—In Step 110, a preliminary analysis is conducted using an Analysis Module. This phase involves identifying any obvious patterns or anomalies and establishing a baseline understanding of the data through statistical methods and visual inspections. Techniques such as mean, median, and standard deviation calculations, as well as scatter plots and time-series graphs, are used to gain initial insights into the data's behavior. The analysis module might use statistical software like R or Python libraries such as Pandas and Matplotlib for this purpose.

Step 112: Data Cleanup—The data then undergoes a cleanup phase in Step 112, managed by a Data Cleanup Module. During this phase, noise and irrelevant information are systematically removed, ensuring the dataset's accuracy and reliability. This step involves outlier removal to exclude extreme values that could skew the analysis, interpolation to fill missing values, and normalization to standardize data scales. Tools like OpenRefine or Python libraries such as Scikit-learn are commonly used for data cleaning tasks.

Step 114: Feature Engineering—Feature engineering is performed in Step 114 using a Feature Engineering Module. In this step, the cleaned data is transformed into a structured format that highlights significant attributes for machine learning algorithms. This involves creating new variables that capture important aspects of the data, aggregating data points to summarize information over specific periods, and encoding categorical variables into numerical formats suitable for machine learning. Effective feature engineering can significantly enhance the predictive power of the models by making underlying patterns in the data more accessible to the algorithms. Tools like FeatureTools or Python libraries like Scikit-learn and Pandas are often used.

Step 116: Data Ingestion—The engineered features are then ingested into a primary storage source (Step 116) using a Data Ingestion Module. This step involves organizing the data for efficient access and retrieval, ensuring compatibility with big data frameworks like Hadoop or Spark. Structured storage allows for scalable and efficient data processing, facilitating seamless integration with various analysis and modeling tools. The data ingestion module might use Apache NiFi, Apache Kafka, or cloud-based solutions like AWS Glue.

Step 118: Storage and Primary Data Source—In Step 118, the data is stored in a structured format in a Primary Data Storage System. This system uses databases or data warehouses optimized for large-scale data storage and retrieval. Technologies like Hadoop HDFS, Amazon S3, or relational databases like PostgreSQL are commonly used.

Step 120: Data Retrieval—In Step 120, the stored data is retrieved for detailed trend analysis using sophisticated algorithms. A Data Retrieval Module is employed to detect regularities and irregularities within the data. This module uses SQL queries or API calls to access specific datasets efficiently, ensuring that the data retrieval process is both accurate and timely. It integrates with data storage systems to fetch the required data and preprocess it for analysis.

Step 122: Trend Analysis—Unique trends and patterns within the data are identified in Step 122 by analyzing temporal sequences and external influencers such as holidays and weekends. This is achieved using a Trend Analysis Module, which applies techniques like moving averages to smooth out short-term fluctuations, seasonal decomposition to separate seasonal effects from long-term trends, and Fourier transforms to analyze periodic components. Understanding these trends is crucial for accurate anomaly detection as it allows the system to distinguish between expected variations and true anomalies. Analytical tools and libraries like R, Python (Statsmodels, SciPy), and MATLAB are used for this analysis.

Step 124: Cluster Trends—Once trends are identified, the data is clustered into distinct segments representing different patterns in Step 124 using a Clustering Module. Methods such as K-means clustering, hierarchical clustering, or DBSCAN are used to group similar data points based on their characteristics. Each cluster represents a unique pattern influenced by various factors, allowing the system to tailor its analysis and modeling to the specific behavior of each cluster. Clustering helps in managing the complexity of the data by breaking it down into more manageable segments, each with its own unique characteristics. Machine learning libraries like Scikit-learn or specialized tools like H2O.ai are used for clustering.

Step 126: Pattern-Specific Modeling—For each cluster, specific predictive models are developed in Step 126 using a Model Development Module. Machine learning models like Random Forest, Gradient Boosting, or neural networks are trained to recognize the unique characteristics of each segment. These models are designed to capture the complex relationships within the data, providing accurate predictions based on historical trends. Model development involves selecting the appropriate algorithms, tuning hyperparameters, and validating the models to ensure their accuracy and robustness. Tools like TensorFlow, Keras, or Scikit-learn are used for developing these models.

Step 128: Serialize Model—These predictive models are then serialized in Step 128 using a Model Serialization Module. Serialization involves converting the models into a format that can be efficiently stored and retrieved, employing formats like PMML (Predictive Model Markup Language) or ONNX (Open Neural Network Exchange) to facilitate interoperability and scalability. Serialized models can be easily loaded and applied to new data, ensuring that the system remains efficient and responsive. Tools like ONNX or PMML libraries are used for serialization.

The following is a discussion of the Anomaly Classification Flow. Step 200: Data Stream—In the anomaly classification flow, incoming data points continue to be processed in real-time, starting from Step 200. The Data Streaming Module ensures continuous data flow and real-time processing capabilities.

Step 202: Data Point—Step 202 represents the specific incoming data points that need to be classified and analyzed for potential anomalies. These points are processed through the same modules used in the initial data ingestion phase to ensure consistency.

Step 204: Identify Trend—In Step 204, a Classification Module determines the relevant trend cluster to which the incoming data point belongs. This module uses supervised learning algorithms like decision trees or support vector machines to compare new data points to historical data patterns, ensuring accurate classification. Accurate classification is crucial as it determines which predictive model will be used to analyze the new data point. Tools like Scikit-learn, TensorFlow, or custom-built classifiers are employed for this purpose.

Step 208: Load Model—Once classified, the appropriate predictive model for the identified trend cluster is selected and loaded in Step 208 using a Model Selection and Loading Module. This module ensures that the correct model is applied for anomaly detection, leveraging the specific characteristics and patterns of the identified cluster. It dynamically links the data point to the appropriate serialized model, ensuring efficient and accurate analysis.

Step 210: Classify Data Point—The classified data points are then compared against the expected patterns predicted by the model in Step 210 using a Comparison Module. This involves calculating residuals, which are the differences between the observed and predicted values, and applying threshold criteria to identify significant deviations. This comparison helps to determine if the data point deviates significantly from the expected pattern, which would indicate an anomaly.

Step 212: Determine Whether An Anomaly Has Occurred—If significant deviations are detected, the data point is classified as an anomaly in Step 212 by an Anomaly Detection Module. This module uses statistical tests, machine learning classifiers, or ensemble methods to ensure robust detection. Ensemble methods combine the predictions from multiple models to improve the overall accuracy and reliability of the anomaly detection process. Tools like Isolation Forest, Local Outlier Factor, or custom-built anomaly detection algorithms are used.

Step 220: Generate An Automated Response—When an anomaly is detected, an automated response is generated in Step 220 by an Automated Response Module. This response might include sending alerts or initiating remedial actions via email, SMS, or system logs, ensuring timely and effective mitigation of potential issues. Automated responses can be tailored to the severity and nature of the anomaly, ensuring appropriate and timely interventions. Integration with incident management systems or automation tools like Zapier or custom-built workflows ensures swift action.

Step 218: Analyze and Step 216: Report—If no anomaly is detected, the data is analyzed and reported in Steps 218 and 216, respectively. The Analysis Module continues to monitor the data for patterns, and the Reporting Module generates regular reports on data trends and system performance. These modules ensure continuous improvement and provide insights for further refinement of the models.

Finally, in Step 214, the process concludes without further action if no anomalies are detected, allowing the system to continue monitoring and analyzing incoming data seamlessly. This continuous real-time surveillance and anomaly detection capability is maintained by a Monitoring Module, ensuring that the system remains vigilant and responsive to new data. This comprehensive and detailed approach ensures high accuracy and reliability in detecting anomalies in time series data, particularly in datasets exhibiting irregular trends due to non-periodic events such as holidays and weekends. By leveraging advanced machine learning techniques and robust data processing workflows, the system provides a powerful tool for managing and analyzing complex time series data, enabling timely and accurate detection of anomalies that could indicate potential issues or opportunities.

This end-to-end process ensures that every aspect of the data, from collection to analysis and response, is handled with precision and efficiency, leveraging the latest in data science and machine learning technologies to provide robust and reliable anomaly detection.

Figure 2:
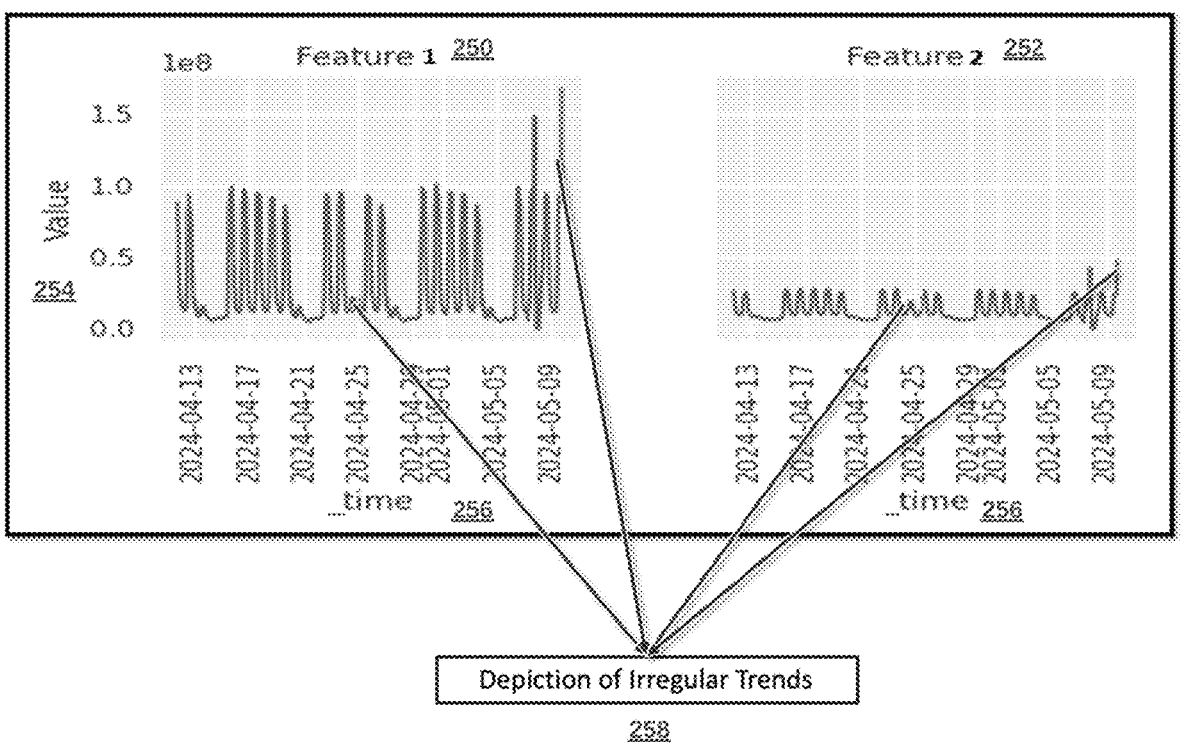
FIG. 2 is an illustration depicting irregular trends in a graphical format, showcasing variations in data points over a specified period. It highlights anomalies or deviations from expected patterns, which are critical for identifying irregularities such as, for example, in the first aspect of the disclosure inventions.
Figure 3A:
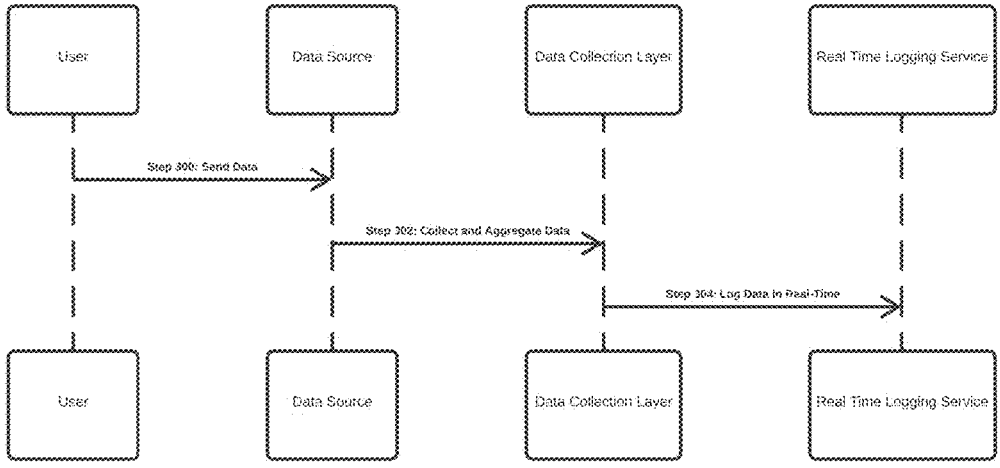
FIGS. 3A-3D are sequence diagrams for the first aspect of the invention illustrating the comprehensive data processing workflow, starting from data collection and logging, followed by extraction, analysis, and transformation into features suitable for machine learning. The process continues with predictive modeling, anomaly detection, and automated responses, ensuring efficient identification and handling of anomalies.
Figure 3B:
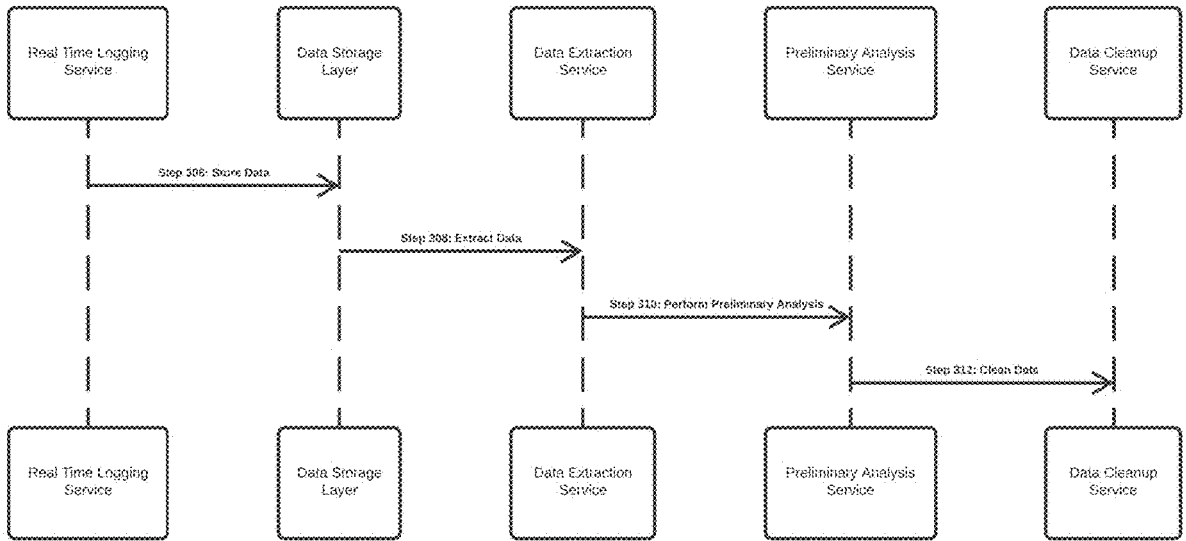
Figures 3C, 3D:
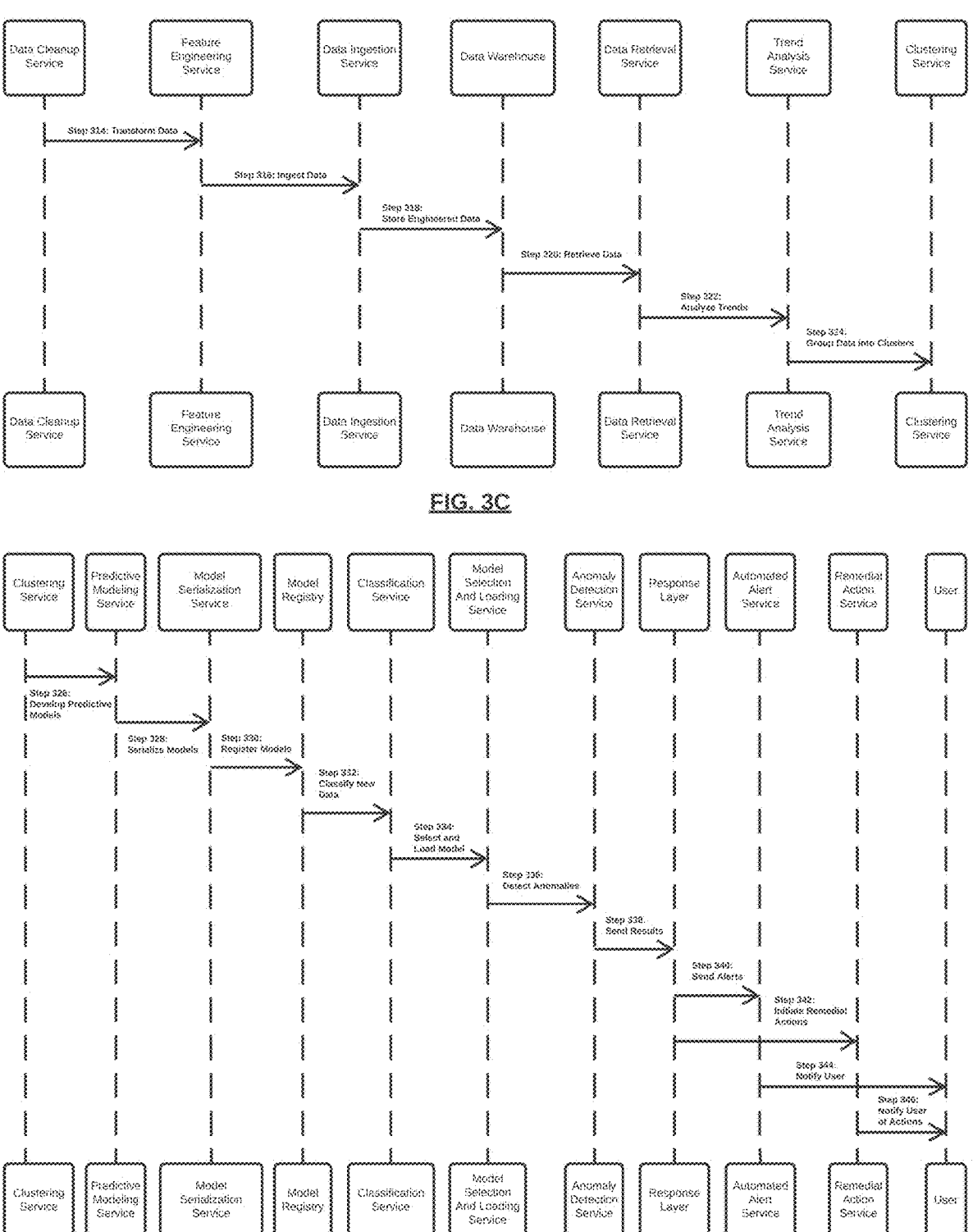

FIG. 2 is an illustration depicting irregular trends in a graphical format, showcasing variations in data points over a specified period. It highlights anomalies or deviations from expected patterns, which are critical for identifying irregularities such as, for example, in the first aspect of the disclosure inventions.

Graphs for two features for the same time period are juxtaposed next to one another. The graph on the left 250 shows performance for a first feature wherein the performance metric (e.g., volume) 254 is represented on the y-axis and the date and/or timestamp is shown on the x-axis 256. The graph on the right 252 shows the performance vs. time for the second feature. Irregular trends are identified 258.

In FIGS. 3A-3D, the sequence diagrams for the first invention illustrate a comprehensive data processing workflow, starting with the User who initiates the data process. Data is collected from the DataSource, which could be IoT devices, transaction logs, sensor networks, or other source data. This data is then gathered by the DataCollectionLayer, responsible for aggregating data from various sources. The RealTimeLoggingService logs the collected data in real-time, ensuring temporal integrity, and this logged data is stored in the DataStorageLayer. The DataExtractionService extracts relevant data for further processing, and the Preliminary AnalysisService performs an initial analysis on the extracted data.

Next, the DataCleanupService cleans the data by removing noise and irrelevant information, ensuring high-quality data for analysis. The FeatureEngineeringService transforms this cleaned data into features suitable for machine learning models, which are then ingested by the DataIngestionService into the data storage. The DataWarehouse serves as the central repository for storing these engineered data features. For further analysis, the DataRetrievalService retrieves stored data, which is then analyzed for trends by the TrendAnalysisService. Based on these trends, the ClusteringService groups similar data points, and the PredictiveModelingService develops predictive models for each cluster.

The ModelSerializationService serializes these developed models for efficient storage and retrieval, and the serialized models are registered in the ModelRegistry. When new data points are introduced, the ClassificationService classifies them using these registered models. The ModelSelectionAndLoadingService selects and loads the appropriate model for classifying the new data points, while the AnomalyDetectionService detects anomalies in the classified data. The ResponseLayer handles the response to detected anomalies, sending alerts through the AutomatedAlertService and initiating remedial actions through the RemedialActionService. This detailed sequence ensures efficient data processing, anomaly detection, and timely responses to maintain system integrity.

The sequence diagram starts with the User (Step 300) initiating the process by sending data to the DataSource. The DataSource could be various origins such as IoT devices, transaction logs, or sensor networks. These sources collect raw data and forward it to the DataCollectionLayer (Step 302), which is responsible for aggregating data from these multiple sources. The DataCollectionLayer then hands over the aggregated data to the RealTimeLoggingService (Step 304), where the data is logged in real-time. This real-time logging ensures that every data point is captured accurately with its timestamp, preserving the temporal integrity essential for subsequent analysis.

Once logged, the data is stored in the DataStorageLayer (Step 306). This layer acts as a repository, making the data readily available for further stages of processing. The DataExtractionService (Step 308) extracts relevant portions of this stored data, filtering out unnecessary information to ensure only pertinent data is passed along. The Preliminary-AnalysisService (Step 310) takes the extracted data and performs an initial analysis, identifying any obvious patterns or anomalies that could inform further processing.

After preliminary analysis, the data goes through the DataCleanupService (Step 312), where noise and irrelevant information are removed. This cleaning process is crucial to maintain the quality of the data, ensuring it is accurate and reliable for advanced processing stages. The cleaned data is then handled by the FeatureEngineeringService (Step 314), which transforms it into a structured format suitable for machine learning models. This transformation, known as feature engineering, highlights significant attributes or features within the data.

The transformed data is ingested into the system by the DataIngestionService (Step 316). This service integrates the engineered features into the data storage, specifically into the DataWarehouse (Step 318). The DataWarehouse serves as the central repository where all processed data is stored. To prepare for detailed analysis, the DataRetrievalService (Step 320) retrieves the stored data from the warehouse. The retrieved data is then passed to the TrendAnalysisService (Step 322), which analyzes trends and patterns within the data overtime. Finally, the ClusteringService (Step 324) uses these identified trends to group similar data points, forming distinct clusters that simplify the complexity of the data for further analysis.

The sequence diagram continues focusing on advanced data processing and anomaly detection. The ClusteringService (Step 326) takes the clustered data and works with the PredictiveModelingService to develop predictive models for each cluster. These models are designed to capture the unique characteristics of each data cluster and make accurate predictions based on historical data patterns.

Once developed, these predictive models are serialized by the ModelSerializationService (Step 328). Serialization converts the models into a format suitable for efficient storage and retrieval. These serialized models are then registered in the ModelRegistry (Step 330), making them available for future classification tasks. When new data points are introduced into the system, the ClassificationService (Step 332) uses these registered models to classify the new data accurately.

To ensure the most relevant model is used for classification, the ModelSelectionAndLoadingService (Step 334) selects and loads the appropriate model for each new data point. This selection process optimizes the accuracy of the classification. The AnomalyDetectionService (Step 336) then examines the classified data for any anomalies. This service identifies significant deviations from expected patterns, which could indicate potential issues or irregularities.

The results of the anomaly detection are sent to the ResponseLayer (Step 338). This layer coordinates the system's response to detected anomalies. If anomalies are found, the ResponseLayer sends alerts through the AutomatedAlertService (Step 340), notifying relevant stakeholders about the detected issues. These alerts can be delivered via various channels, such as email, SMS, or system logs, ensuring prompt attention to potential problems. Additionally, the ResponseLayer initiates remedial actions through the RemedialActionService (Step 342) to address and mitigate any identified issues.

Finally, the AutomatedAlertService (Step 344) sends detailed alerts to the User, informing them about the detected anomalies and any immediate actions taken. Simultaneously, the RemedialActionService (Step 346) notifies the User about the specific remedial actions initiated to resolve the issues. This comprehensive sequence ensures that the system not only detects anomalies efficiently but also responds to them promptly, maintaining the integrity and reliability of the overall process.

Figure 4:
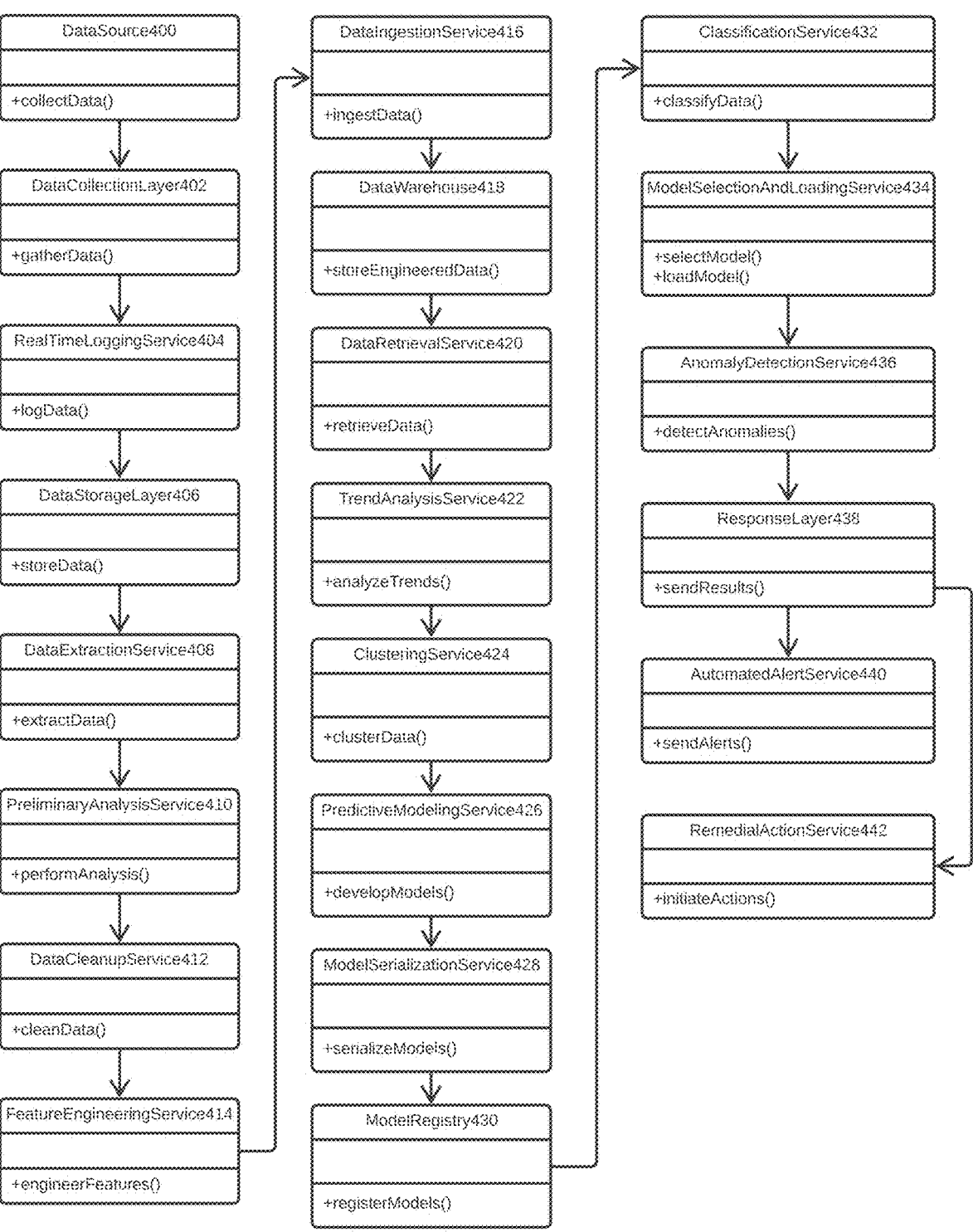
FIG. 4 is a class diagram illustrating a comprehensive data processing and anomaly detection system for the first aspect of the invention, showcasing classes responsible for tasks ranging from data collection, logging, and storage, to feature engineering, predictive modeling, and anomaly detection. Each class methodically transforms and analyzes the data, ensuring that anomalies are detected and addressed through automated alerts and remedial actions, maintaining system integrity and performance.

In FIG. 4, the class diagram for the first invention illustrates a comprehensive data processing and anomaly detection system. It begins with the DataSource400 class, which includes the method 'collectData( )'. This method is responsible for gathering data from various sources, such as IoT devices, transaction logs, and sensor networks. These sources can include a wide range of data points: IoT devices might collect information from smart home gadgets, wearable health monitors, or industrial equipment sensors; transaction logs could track financial transactions, e-commerce activities, or other business processes; and sensor networks might gather environmental data, weather conditions, or traffic information. The 'collectData( )' method ensures that diverse data streams are captured accurately and efficiently, enabling the system to handle vast amounts of data from multiple origins simultaneously.

Once the data is collected, it is passed to the DataCollectionLayer402 class. The 'gatherData( )' method in this class aggregates the incoming data and prepares it for real-time logging. This layer acts as a central hub where all data streams converge, ensuring that the data is synchronized and ready for immediate processing. By handling the aggregation efficiently, this layer ensures that no data is lost and that the subsequent steps have access to a comprehensive dataset.

The data is then logged by the RealTimeLoggingService404 class using the 'logData( )' method. This service captures the data in real-time, preserving its temporal integrity and allowing for accurate sequence analysis. Real-time logging is critical for applications where the timing and order of data points are essential, such as in financial trading systems, industrial automation, or emergency response systems. The real-time aspect ensures that the data is up-to-date and accurately reflects the current state of the monitored systems or environments.

The logged data is stored in the DataStorageLayer406 class through its 'storeData( )' method, making the data available for extraction and further processing. This storage layer acts as a robust and scalable repository designed to handle large volumes of data while ensuring quick access and retrieval. It uses efficient data management techniques to store the data securely and make it easily accessible for subsequent processing stages.

Next, the DataExtractionService408 class takes over with its 'extractData( )' method. This method filters out redundant or irrelevant information from the stored data, ensuring that only the most relevant data is extracted for analysis. This step is crucial for maintaining the efficiency of the system, as it reduces the amount of data that needs to be processed further. By focusing on the most pertinent data, the system can perform more accurate and meaningful analyses, leading to better insights and decision-making.

The extracted data is then subjected to preliminary analysis by the PreliminaryAnalysisService410 class. The 'performAnalysis( )' method in this class identifies any obvious patterns or anomalies in the data. This initial analysis helps in understanding the general structure and characteristics of the data, setting the stage for more detailed examination. It can reveal trends, outliers, and other significant features that guide the next steps in the processing pipeline.

Following the preliminary analysis, the data is cleaned by the DataCleanupService412 class using its 'cleanData( )' method. This step is crucial as it removes noise and irrelevant information, thereby ensuring the quality of the data for subsequent processing. Data cleaning might involve handling missing values, correcting inconsistencies, and eliminating outliers that could distort the analysis. Clean data is essential for achieving reliable and accurate results in later stages of processing and analysis.

The cleaned data is then transformed into features suitable for machine learning models by the FeatureEngineeringService414 class. The 'engineerFeatures( )' method in this class performs this transformation, which may include creating new variables, scaling, and encoding categorical data. Feature engineering is a vital step that can significantly impact the performance of machine learning models. Well-engineered features can enhance the model's ability to learn patterns and make accurate predictions.

The engineered features are then ingested by the DataIngestionService416 class through its 'ingestData( )' method. This data is stored in the DataWarehouse418 class, which utilizes the 'storeEngineeredData( )' method to maintain a central repository of the processed data. The data warehouse is designed to store large volumes of historical and current data, providing a foundation for comprehensive analysis. It supports efficient querying and retrieval, allowing analysts and automated systems to access the data quickly and perform complex analyses.

For further analysis, the data is retrieved by the DataRetrievalService420 class using the 'retrieveData( )' method. This service ensures that the required data is available for in-depth analysis and model building. By providing timely access to the data, this service facilitates the exploration of data patterns and the development of sophisticated analytical models.

The TrendAnalysisService422 class then analyzes trends within the retrieved data using its 'analyzeTrends( )' method. This involves identifying patterns and regularities in the data, such as seasonal variations, long-term trends, or sudden shifts. Trend analysis is essential for making predictions and understanding the underlying dynamics of the data. It helps in identifying stable patterns that can be used to forecast future values and detect deviations from expected behavior.

The identified trends are used by the ClusteringService424 class to group similar data points. The 'clusterData( )' method in this class creates clusters of data points that exhibit similar trends. Clustering helps in segmenting the data into meaningful groups, making it easier to analyze and interpret. It can reveal underlying structures in the data, such as customer segments, market trends, or operational patterns.

The PredictiveModelingService426 class then develops predictive models for each data cluster using the 'developModels( )' method. These models are trained to recognize patterns within each cluster and make accurate predictions based on historical data. Predictive modeling can be used for various applications, such as forecasting sales, predicting equipment failures, or detecting fraudulent transactions. The models are tailored to the specific characteristics of each cluster, enhancing their predictive accuracy.

Once developed, these predictive models are serialized by the ModelSerializationService428 class through its 'serializeModels( )' method. Serialization converts the models into a format suitable for storage and retrieval, ensuring that they can be easily reused and deployed. Serialized models can be stored efficiently and loaded quickly when needed, making them accessible for real-time or batch processing.

The serialized models are registered in the ModelRegistry430 class, which uses the 'registerModels( )' method to make these models available for classification and anomaly detection. The model registry acts as a centralized repository, ensuring that all models are versioned and managed efficiently. It keeps track of model versions, updates, and performance metrics, providing a reliable source of information for model selection and deployment.

When new data points are received, the ClassificationService432 class classifies them using the registered predictive models. The 'classifyData( )' method in this class ensures that the data is correctly categorized based on the learned patterns. This classification process is crucial for applications such as fraud detection, where new transactions need to be assessed quickly and accurately. By using the most appropriate model, the system can achieve high classification accuracy and detect potential issues early.

The ModelSelectionAndLoadingService434 class then selects and loads the appropriate model for classifying the new data points. The 'selectModel( )' and 'loadModel( )' methods handle this process, ensuring that the most suitable model is used for each classification task. This selection process optimizes the accuracy of the classification and ensures that the system adapts to changing data patterns and model updates.

The AnomalyDetectionService436 class detects anomalies in the classified data using its 'detectAnomalies( )' method. This service identifies significant deviations from expected patterns, which could indicate potential issues such as fraud, equipment failure, or security breaches. Anomaly detection is critical for maintaining the reliability and security of the system, as it allows for early identification and response to abnormal events.

When anomalies are detected, the results are sent to the ResponseLayer438 class via the 'sendResults( )' method. The ResponseLayer438 coordinates the response to these anomalies. If necessary, it sends alerts through the AutomatedAlertService440 using the 'sendAlerts( )' method, notifying stakeholders about the detected issues. Alerts can be configured to be sent via email, SMS, or other communication channels, ensuring timely awareness of potential problems. Additionally, the ResponseLayer438 initiates remedial actions through the RemedialActionService442 with the 'initiateActions( )' method. These actions might include steps to mitigate the impact of the anomaly, such as shutting down affected systems, initiating backup processes, or triggering manual inspections.

This system ensures a comprehensive and detailed approach to data processing and anomaly detection. Each class and method play a crucial role in maintaining data integrity, performing thorough analysis, and ensuring timely responses to detected anomalies. By integrating advanced data processing techniques with robust anomaly detection mechanisms, the system provides a reliable framework for managing and analyzing large volumes of data, identifying potential issues, and responding effectively to maintain operational continuity and security. The detailed workflow from data collection to anomaly detection and response highlights the system's capability to handle complex data environments and deliver actionable insights, ensuring that anomalies are detected and addressed promptly to mitigate risks and enhance decision-making.

Figure 5:
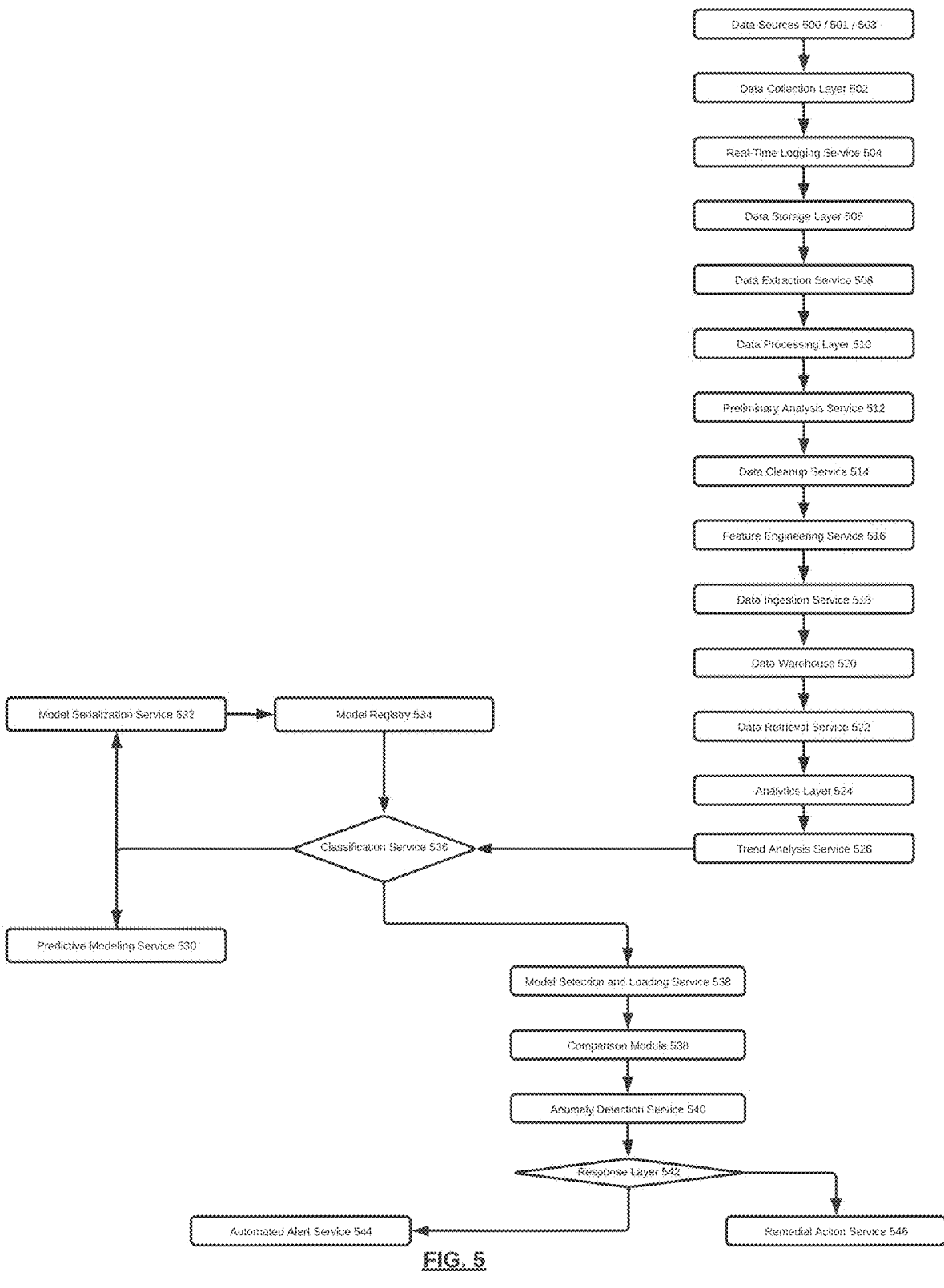
FIG. 5 illustrates a comprehensive cloud architecture for the first aspect of the invention for data processing and anomaly detection, beginning with data collection from various sources like IoT devices, transaction logs, and sensor networks. The architecture includes layers for real-time logging, storage, extraction, processing, analysis, and response, ensuring efficient data handling and timely identification and mitigation of anomalies.

FIG. 5 is a cloud architecture diagram that presents a comprehensive framework for processing, analyzing, and responding to data anomalies. This architecture is meticulously structured to handle data from collection to real-time analysis, ensuring timely and accurate responses to detected anomalies. Each layer and service in the architecture plays a vital role in maintaining data integrity and operational efficiency.

The architecture begins with Data Sources, which include:

IoT Devices (500): These devices are part of the Internet of Things (IoT) ecosystem, collecting data from a wide array of connected devices such as smart home gadgets, industrial machinery, and health monitors. They continuously generate data points like temperature readings, operational statuses, and user interactions.

Transaction Logs (501): These logs record detailed information about transactions in various systems, such as e-commerce purchases, banking transactions, and business operations. Transaction logs provide valuable insights into patterns of behavior and potential anomalies in financial activities.

Sensor Networks (503): These networks consist of distributed sensors that monitor environmental conditions, such as weather stations, pollution monitors, and agricultural sensors. They provide real-time data on factors like temperature, humidity, air quality, and soil moisture.

The Data Collection Layer (502) aggregates and organizes the data from these multiple sources. It ensures that data from different origins is synchronized and integrated efficiently. This layer is critical for preparing the data for real-time logging, ensuring that no data points are missed and that the data is ready for immediate processing.

The Real-Time Logging Service (504) logs the collected data in real-time, capturing each data point with precise timestamps. This service is crucial for maintaining the temporal integrity of the data, which is essential for accurate sequence analysis and anomaly detection. Real-time logging ensures that the data reflects the current state of the monitored systems or environments, allowing for timely insights and responses.

Once logged, the data is stored in the Data Storage Layer (506). This layer acts as a robust and scalable repository designed to handle large volumes of data while ensuring quick access and retrieval. It uses advanced data management techniques to store the data securely and make it easily accessible for further processing stages.

The Data Extraction Service (508) extracts relevant data from the storage layer. This service filters out redundant or irrelevant information, ensuring that only the most pertinent data is passed on for processing. This step is vital for maintaining the efficiency and accuracy of the system, as it reduces the volume of data that needs to be processed further.

The extracted data then enters the Data Processing Layer (510), where it undergoes initial processing. Within this layer, the Preliminary Analysis Service (512) performs a preliminary analysis, identifying any obvious patterns or anomalies in the data. This step helps in understanding the basic structure and characteristics of the data, setting the stage for more detailed examination.

The Data Cleanup Service (514) cleans the data by removing noise and irrelevant information, ensuring high-quality data for further processing. This service addresses issues such as missing values, inconsistencies, and outliers, which could otherwise distort the analysis results. Clean data is essential for achieving reliable and accurate results in later stages of processing and analysis.

The Feature Engineering Service (516) transforms the cleaned data into features suitable for machine learning models. This service creates new variables, scales data, and encodes categorical variables, enhancing the data's utility for predictive modeling. Well-engineered features significantly impact the performance of machine learning models by improving their ability to learn patterns and make accurate predictions.

The engineered features are then ingested into the system by the Data Ingestion Service (518) and stored in the Data Warehouse (520). The data warehouse acts as a central repository for the processed data, supporting efficient storage and retrieval. It maintains the engineered data features, making them available for in-depth analysis and model building.

For further analysis, the Data Retrieval Service (522) retrieves the stored data, ensuring it is available for further examination. This service facilitates timely access to the data, enabling analysts and automated systems to explore data patterns and develop sophisticated analytical models.

The Analytics Layer (524) performs comprehensive data analysis. Within this layer, the Trend Analysis Service (526) analyzes trends and patterns in the data, identifying long-term trends, seasonal variations, and sudden changes. Trend analysis is essential for making predictions and understanding the underlying dynamics of the data.

Based on the identified trends, the Clustering Service (528) groups similar data points into clusters. This service segments the data into meaningful groups, simplifying the analysis and interpretation. Clustering helps in identifying distinct patterns and structures within the data, such as customer segments, market trends, or operational patterns.

The Predictive Modeling Service (530) develops predictive models for each data cluster. These models are trained to recognize patterns within each cluster and make accurate predictions based on historical data. Predictive modeling can be used for various applications, such as forecasting sales, predicting equipment failures, or detecting fraudulent transactions.

Once developed, these predictive models are serialized by the Model Serialization Service (532). Serialization converts the models into a format suitable for storage and retrieval, ensuring that they can be easily reused and deployed. Serialized models are stored efficiently and loaded quickly when needed, making them accessible for real-time or batch processing.

The serialized models are registered in the Model Registry (534), making them available for future use. This registry acts as a centralized repository for managing and versioning the predictive models, ensuring they are easily accessible and up-to-date. It keeps track of model versions, updates, and performance metrics, providing a reliable source of information for model selection and deployment.

When new data points are received, the Classification Service (536) classifies them using the registered predictive models. This service ensures that new data is accurately categorized based on the learned patterns. The classification process is crucial for applications such as fraud detection, where new transactions need to be assessed quickly and accurately.

The Model Selection and Loading Service (538) selects and loads the appropriate model for classifying the new data points. The 'selectModel( )' and 'loadModel( )' methods handle this process, ensuring that the most suitable model is used for each classification task. This selection process optimizes the accuracy of the classification and ensures that the system adapts to changing data patterns and model updates.

The Anomaly Detection Service (540) detects anomalies in the classified data, identifying significant deviations from expected patterns. These anomalies could indicate potential issues such as fraud, equipment failure, or security breaches. Anomaly detection is critical for maintaining the reliability and security of the system, as it allows for early identification and response to abnormal events.

The results of the anomaly detection are sent to the Response Layer (542), which coordinates the system's response. This layer handles the response to detected anomalies and ensures that appropriate actions are taken to address potential issues.

If anomalies are detected, the Response Layer (542) sends alerts through the Automated Alert Service (544), notifying relevant stakeholders about the detected issues. Alerts can be configured to be sent via email, SMS, or other communication channels, ensuring timely awareness of potential problems.

In addition to sending alerts, the Response Layer (542) initiates remedial actions through the Remedial Action Service (546). These actions might include steps to mitigate the impact of the anomaly, such as shutting down affected systems, initiating backup processes, or triggering manual inspections. This comprehensive response mechanism ensures that any detected issues are addressed promptly and effectively, maintaining the system's integrity and operational continuity.

This detailed cloud architecture ensures a comprehensive and efficient approach to data processing, analysis, and anomaly detection. Each component plays a crucial role in maintaining data integrity, performing thorough analysis, and ensuring timely responses to detected anomalies. By integrating advanced data processing techniques with robust anomaly detection mechanisms, the system provides a reliable framework for managing and analyzing large volumes of data, identifying potential issues, and responding effectively to maintain operational continuity and security. The architecture's layered design allows for scalability and flexibility, enabling it to handle diverse data sources and adapt to evolving analytical needs.

Figure 6:
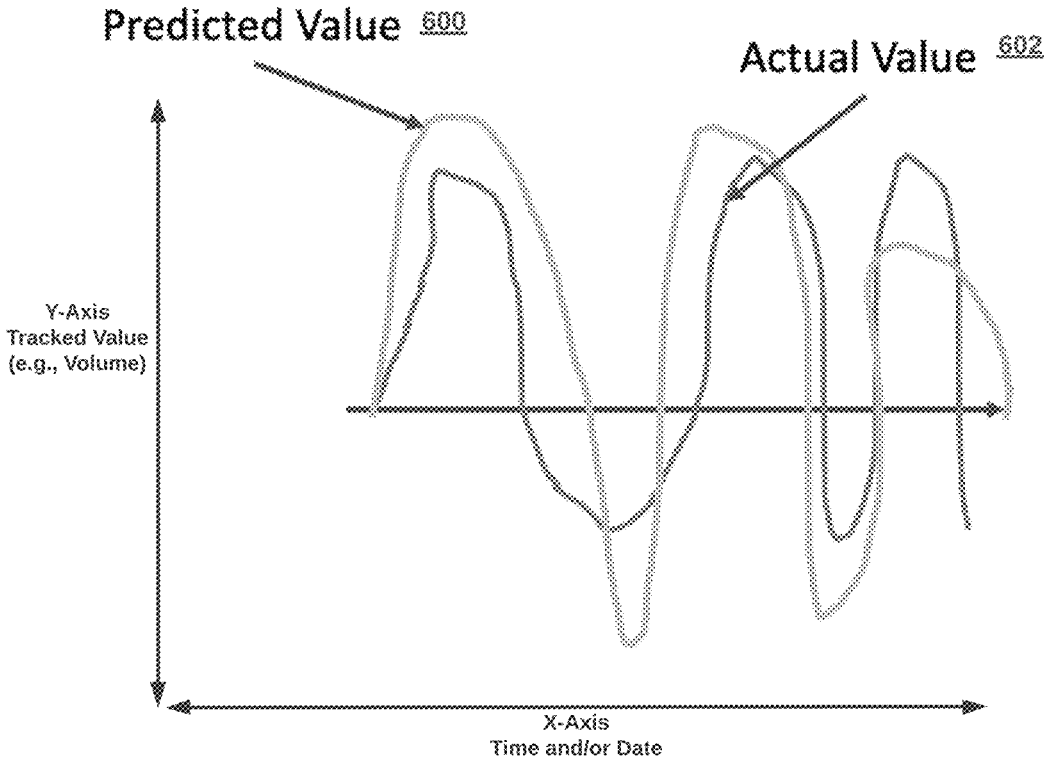
FIG. 6 is an illustration compares actual values with predicted values, showing the relationship and discrepancies between the two sets of data. This visual representation helps in analyzing the accuracy and performance of predictive models by highlighting deviations and patterns in the comparison such as, for example, in the second aspect of the disclosed inventions.

FIG. 6 provides a detailed graphical representation of tracked values over time, illustrating the second aspect of the invention related to anomaly detection in time series data. The Y-axis, labeled as 600, represents the tracked value, which could be any measurable quantity such as volume, sales, temperature, or other relevant metrics. This axis is crucial as it indicates the magnitude of the values being monitored over time, allowing users to gauge fluctuations and trends in the data. The X-axis, representing time and/or date, provides a chronological order to the tracked values. This chronological aspect is essential for identifying patterns, cycles, and trends within the data over specific periods, which is fundamental for accurate trend analysis and anomaly detection.

The figure includes two primary elements: the predicted value and the actual value. The predicted value represents the forecasted data point generated by the system's model for a given time. This predicted value is derived from sophisticated predictive models that have been trained on historical data, incorporating various influencing factors and patterns observed in past data. These models utilize machine learning algorithms to predict future values based on identified trends and patterns. The actual value, on the other hand, is the real-world observed data point recorded at the corresponding time or date. This actual value is collected from various sources such as IoT devices, transaction logs, sensor networks, and other relevant data inputs that provide empirical data for the system to analyze.

The function and purpose of FIG. 6 are centered around the processes of trend analysis and anomaly detection. Trend analysis involves examining the time-series data to identify consistent patterns, cycles, or trends over time. By comparing the actual values with the predicted values, the system can assess the accuracy of its predictive models. When actual values significantly deviate from predicted values, it may indicate an anomaly. Anomalies are data points that differ markedly from the expected pattern and could signify potential issues, irregularities, or events that warrant further investigation. For example, an unexpected spike in sales volume might indicate a successful marketing campaign or an inventory error.

The comparison between actual and predicted values is crucial for the system's ability to detect anomalies. Significant deviations between these values trigger the anomaly detection mechanism, prompting the system to generate alerts or initiate automated responses. This immediate response capability is essential for minimizing potential risks, addressing issues promptly, and maintaining the integrity of the data monitoring process. The graphical representation in FIG. 6 allows users to intuitively visualize these trends and deviations, providing a clear and concise overview of the data's behavior over time.

FIG. 6 is an integral part of the invention as it encapsulates the core functionality of the anomaly detection system. By graphically representing the relationship between predicted and actual values over time, it offers a straightforward way to monitor data trends, detect anomalies, and evaluate the performance of the predictive models. This visualization aids users in making informed decisions, optimizing the predictive models, and ensuring timely and effective responses to detected anomalies. The ability to continuously monitor and analyze time-series data in real-time enhances the system's robustness and reliability, making it a powerful tool for managing complex datasets in various applications such as finance, cybersecurity, manufacturing, and retail.

In conclusion, FIG. 6 illustrates the sophisticated processes involved in the anomaly detection system, highlighting the importance of accurate trend analysis and real-time monitoring. By providing a detailed comparison between predicted and actual values, the figure enables users to identify anomalies, understand underlying trends, and take appropriate actions to address any irregularities. This detailed and robust approach ensures that the system can handle complex and dynamic data environments, providing a valuable tool for maintaining data integrity and operational efficiency across various industries.

Figure 7:
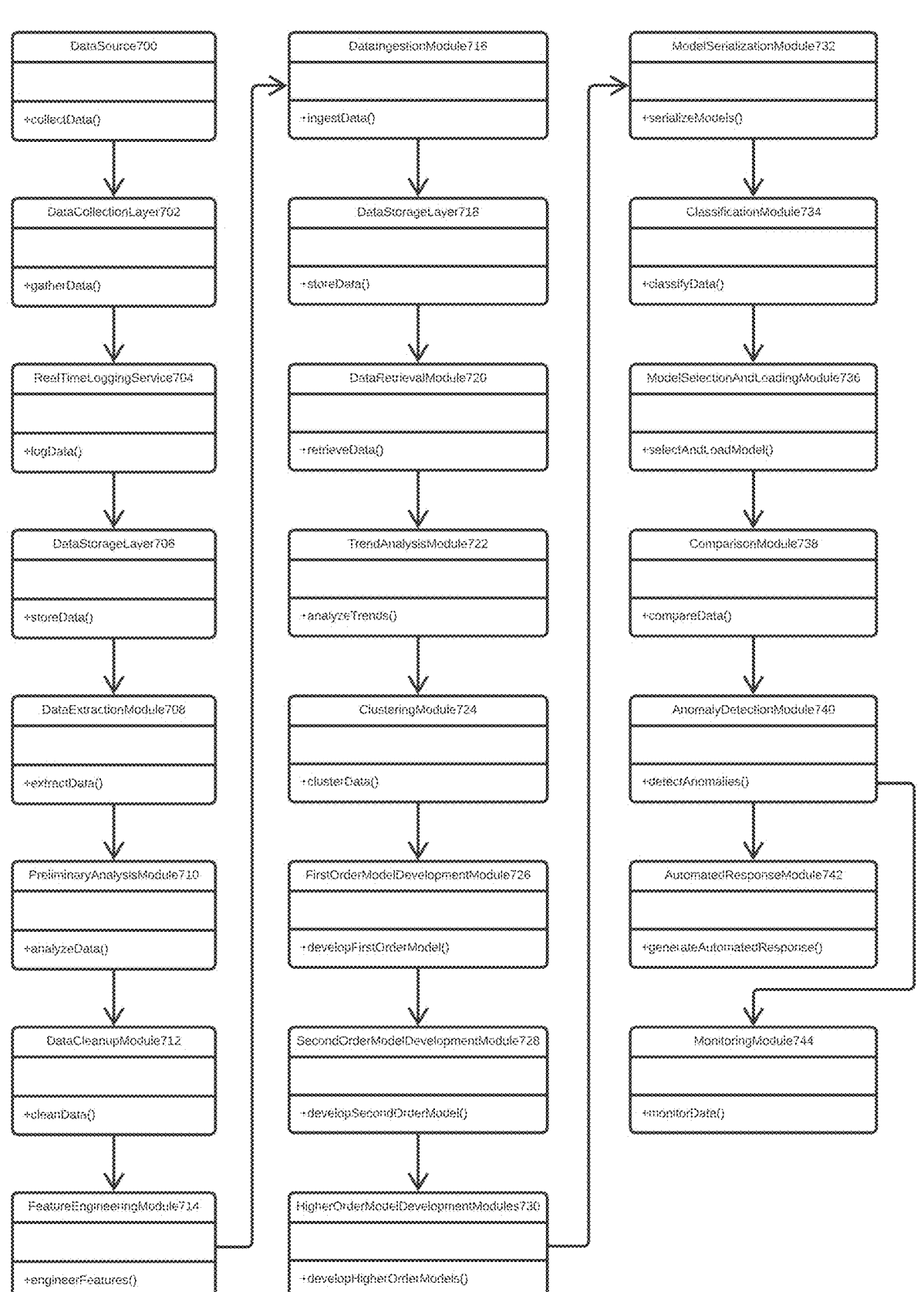
FIG. 7 illustrates a detailed class diagram for the second aspect of the invention, showcasing a comprehensive system for data collection, preprocessing, model development, and anomaly detection. Each class is meticulously designed to handle specific functions, ensuring efficient data transformation, integration, real-time prediction, and anomaly management. This architecture enables a robust and scalable approach to managing complex data environments and ensuring accurate and timely responses to anomalies.
Figure 8A:
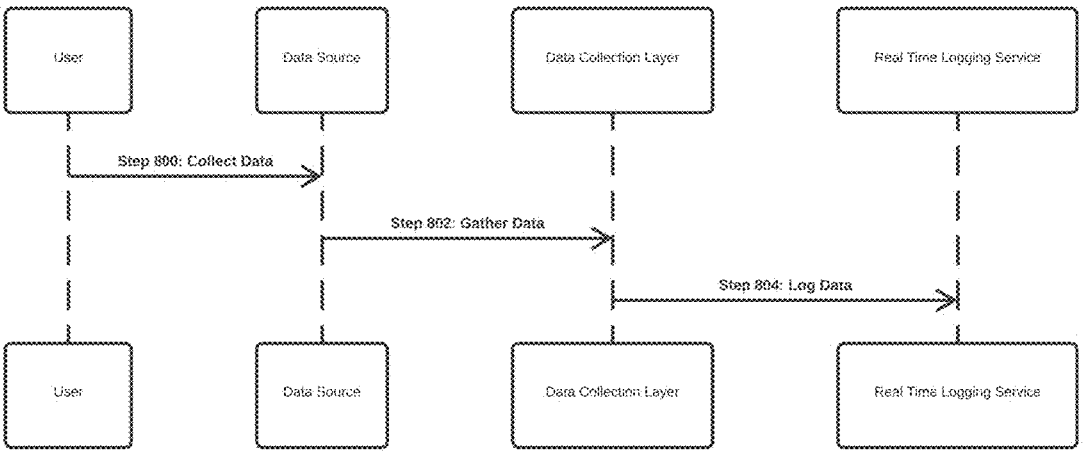
FIGS. 8A-8D are sequence diagrams illustrating a comprehensive workflow for data collection, analysis, and anomaly detection for the second aspect of the invention, ensuring thorough and accurate data processing.
Figure 8B:
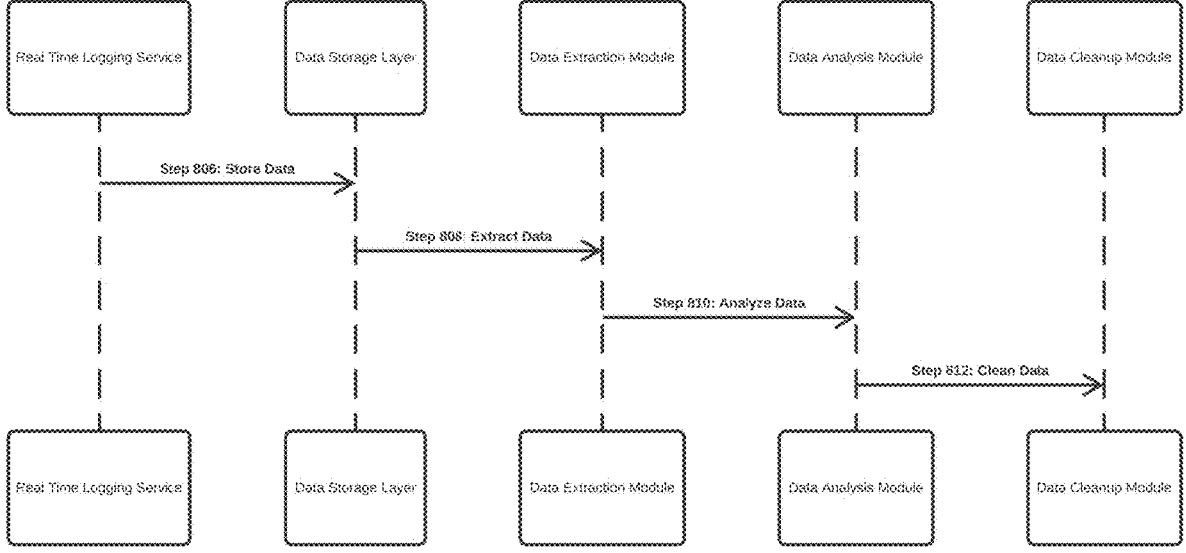
Figures 8C, 8D:
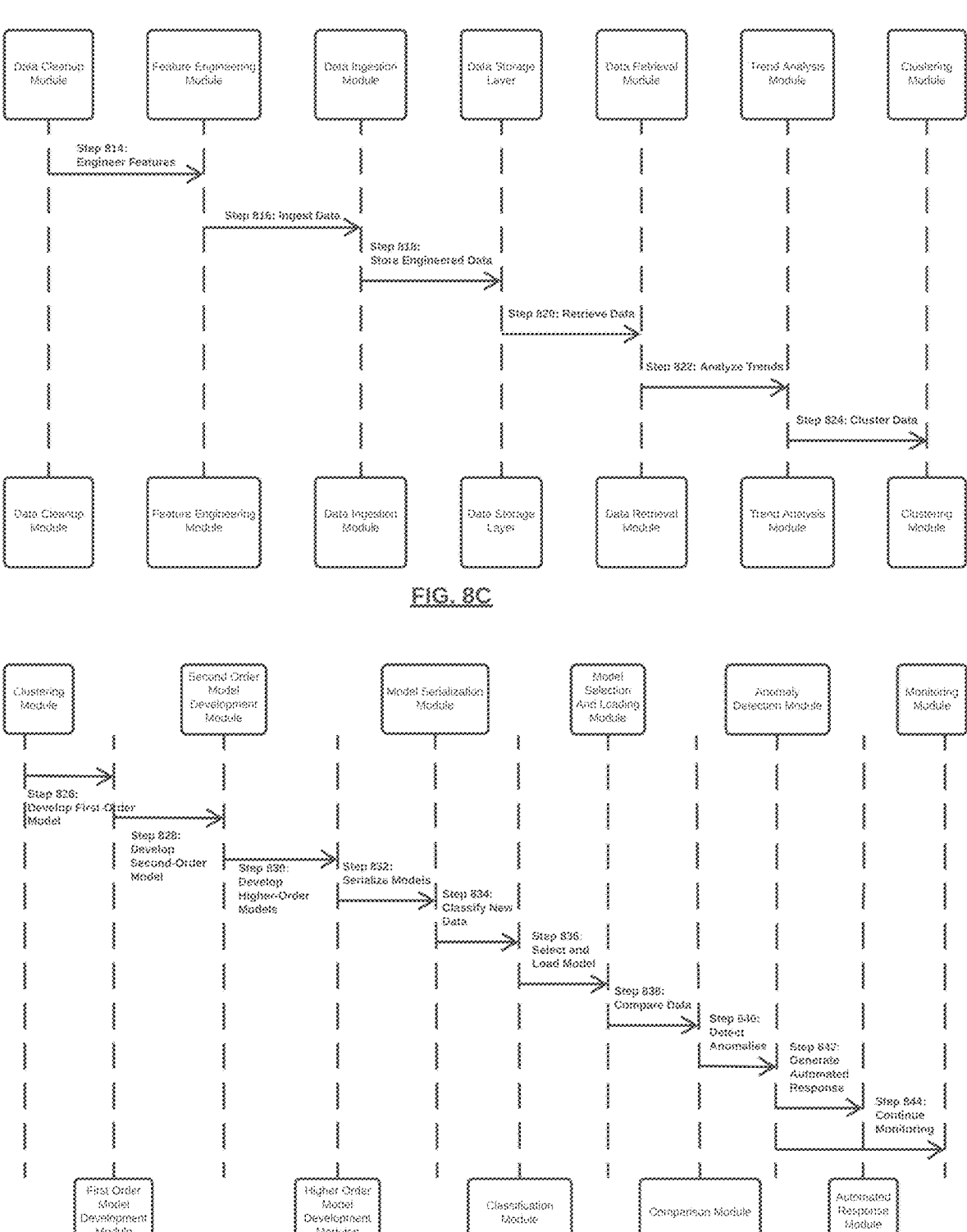

FIG. 7 is a class diagram for the second aspect of the invention and presents a detailed architecture for a sophisticated data processing, model development, and anomaly detection system. Each class within the system is designed to handle specific functions, ensuring efficient data transformation, integration, real-time prediction, and anomaly management. This comprehensive system starts with the DataSource700 class, which contains the 'collectData( )' method. This class is responsible for gathering data at the data inception point from various sources, including IoT devices, transaction logs, and sensor networks. By collecting data from these diverse sources, the system ensures a comprehensive and holistic dataset that captures a wide range of metrics and information.

Once the data is collected, it is passed to the DataCollectionLayer702 class. The 'gatherData( )' method in this class aggregates the incoming data and prepares it for real-time logging. This layer ensures that the data from different origins is synchronized and integrated efficiently. The RealTimeLoggingService704 class logs the collected data in real-time using the 'logData( )' method. This real-time logging maintains temporal integrity and allows for accurate sequence analysis by capturing every data point with precise timestamps. This step ensures that the data is accurately recorded as it is generated, providing a reliable foundation for further analysis.

The logged data is stored in the DataStorageLayer706 class through its 'storeData( )' method. This storage layer provides a robust, scalable, and secure repository, making the data readily accessible for further processing. The DataStorageLayer706 ensures that large volumes of data can be stored efficiently and retrieved quickly, supporting the system's need for rapid data access.

Next, the DataExtractionModule708 class filters and isolates relevant data from the logged data using the 'extractData( )' method. This extraction process removes redundant or irrelevant entries and focuses on critical metrics such as transaction amounts, device activity levels, and sensor readings. By filtering the data, the system ensures that only pertinent information is passed on for further analysis, improving efficiency and accuracy.

The extracted data is analyzed by the DataAnalysisModule710 class through its 'analyzeData( )' method. This module performs preliminary analysis to identify obvious patterns or anomalies, establishing a baseline understanding of the data using statistical methods such as mean, median, and standard deviation, along with visual inspections through graphs and charts. This initial analysis helps to highlight key trends and potential issues early in the process.

The DataCleanupModule712 class cleans the data using the 'cleanData( )' method, removing noise and irrelevant information to ensure accuracy and reliability. This cleaning process involves methods such as outlier removal, interpolation to fill missing values, and normalization to standardize data scales. Clean data is crucial for subsequent stages, as it ensures that the inputs to machine learning models are of high quality.

Following the cleanup, the FeatureEngineeringModule714 class transforms the raw data into a structured format suitable for machine learning algorithms with the 'engineerFeatures( )' method. This transformation includes creating new variables, aggregating data points, and encoding categorical variables into numerical formats. Feature engineering is a vital step that enhances the predictive power of machine learning models by highlighting significant attributes and properties within the data.

The engineered features are ingested by the DataIngestionModule716 class through the 'ingestData( )' method. This module organizes and stores the data in a database or data warehouse for easy access, ensuring that the data is formatted correctly and stored efficiently. The DataRetrievalModule718 class retrieves the stored data for detailed trend analysis using the 'retrieveData( )' method. This retrieval process employs SQL queries or API calls to access specific datasets efficiently, supporting the system's need for timely data access.

The TrendAnalysisModule720 class identifies unique trends and patterns within the data using the 'analyzeTrends( )' method. This analysis applies time-series techniques such as moving averages, seasonal decomposition, and Fourier transforms to uncover hidden patterns and regularities. By understanding the temporal dynamics of the data, the system can make more accurate predictions and detect anomalies effectively.

Based on the identified trends, the ClusteringModule722 class categorizes the data into distinct segments representing different patterns using the 'clusterData( )' method. Clustering methods such as K-means, hierarchical clustering, or DBSCAN group similar data points, making it easier to analyze and interpret the data. This segmentation helps to identify distinct behavior patterns within the data, which can be crucial for targeted analysis and model development.

The FirstOrderModelDevelopmentModule724 class develops a first-order predictive model to predict general trends using the 'developFirstOrderModel( )' method. This initial model applies machine learning techniques such as linear regression or ARIMA to forecast the primary patterns within the data. The SecondOrderModelDevelopmentModule726 class builds on this by developing a second-order predictive model to predict differences identified by the first-order model using the 'developSecondOrderModel( )' method. This involves employing more complex models such as Random Forest or Gradient Boosting to capture additional nuances in the data.

The HigherOrderModelDevelopmentModules728 class continues this hierarchical modeling with higher-order models to successively predict residuals left by previous models using the 'developHigherOrderModels( )' method. This iterative approach ensures that even small irregular trends are captured accurately, enhancing the overall predictive accuracy of the system.

Once the predictive models are developed, the ModelSerializationModule730 class serializes them for efficient storage and retrieval using the 'serializeModels( )' method. This serialization ensures that models can be easily accessed and applied to new data, utilizing formats like PMML (Predictive Model Markup Language) or ONNX (Open Neural Network Exchange). Serialized models facilitate interoperability and seamless integration into various applications.

The ClassificationModule732 class classifies new data points using the registered models with the 'classifyData( )' method. This module determines the relevant trend cluster for each new data point by comparing it to historical data patterns, employing supervised learning algorithms such as decision trees or support vector machines. The ModelSelectionAndLoadingModule734 class selects and loads the appropriate predictive model for the classified data point using the 'selectAndLoadModel( )' method. This dynamic selection ensures that the correct model is applied for anomaly detection, optimizing the system's performance.

The ComparisonModule736 class compares the classified data point against the expected pattern predicted by the model using the 'compareData( )' method. This comparison involves calculating residuals and applying threshold criteria to identify deviations. The AnomalyDetectionModule738 class determines whether the data point is an anomaly based on the comparison using the 'detectAnomalies( )' method. This module identifies significant deviations from expected patterns using statistical tests, machine learning classifiers, or ensemble methods, ensuring robust detection.

If an anomaly is detected, the AutomatedResponseModule740 class generates an automated response using the 'generateAutomatedResponse( )' method. This response may include sending alerts or initiating remedial actions, providing notifications via email, SMS, or system logs, and triggering automated workflows or corrective actions to mitigate potential issues. If no anomaly is detected, the MonitoringModule742 class concludes the process without further action using the 'monitorData( )' method. This module allows the system to continue monitoring and analyzing incoming data in real-time, ensuring continuous surveillance and anomaly detection capabilities.

FIGS. 8A-8D are sequence diagrams illustrating a comprehensive workflow for data collection, analysis, and anomaly detection for the second aspect of the invention, ensuring thorough and accurate data processing.

The sequence diagrams for the second invention provide a detailed, step-by-step workflow for data processing, model development, and anomaly detection. This process begins with the User at Step 800, initiating the data collection process from various sources such as IoT devices, transaction logs, and sensor networks. The DataSource collects this diverse data and sends it to the DataCollectionLayer at Step 802. The DataCollectionLayer aggregates the incoming data, ensuring it is synchronized and ready for further processing.

At Step 804, the RealTimeLoggingService logs the collected data in real-time. This service captures each data point with precise timestamps, preserving the temporal integrity necessary for accurate sequence analysis. The data is then stored securely in the DataStorageLayer at Step 806. This layer acts as a robust repository, facilitating efficient data retrieval for subsequent stages.

The DataExtractionModule takes over at Step 808, extracting relevant data by filtering out redundant or irrelevant entries. This ensures that only critical metrics, such as transaction amounts, device activity levels, and sensor readings, are passed forward. Following extraction, the DataAnalysisModule performs preliminary analysis at Step 810, identifying obvious patterns or anomalies using statistical methods and visual inspections.

At Step 812, the DataCleanupModule cleans the data, removing noise and irrelevant information to ensure accuracy and reliability. This process involves outlier removal, interpolation to fill missing values, and normalization to standardize data scales. The cleaned data is then transformed into features suitable for machine learning by the FeatureEngineeringModule at Step 814. This transformation includes creating new variables, aggregating data points, and encoding categorical variables into numerical formats.

The DataIngestionModule ingests these engineered features at Step 816, organizing and storing them in the data warehouse for easy access. At Step 818, the DataStorageLayer stores the engineered data, ensuring it is readily available for detailed analysis. The DataRetrievalModule retrieves the stored data at Step 820 using SQL queries or API calls, enabling efficient data access for trend analysis. Finally, at Step 822, the TrendAnalysisModule analyzes the retrieved data to identify unique trends and patterns using time-series techniques like moving averages, seasonal decomposition, and Fourier transforms.

The process continues with the TrendAnalysisModule passing the analyzed data to the ClusteringModule at Step 824. The ClusteringModule categorizes the data into distinct segments representing different patterns using clustering methods such as K-means, hierarchical clustering, or DBSCAN. At Step 826, the FirstOrderModelDevelopmentModule develops a first-order predictive model to predict general trends using the clustered data. This model applies machine learning techniques such as linear regression or ARIMA.

Following this, the SecondOrderModelDevelopmentModule develops a second-order predictive model at Step 828. This model predicts differences identified by the first-order model using more complex methods like Random Forest or Gradient Boosting. The HigherOrderModelDevelopmentModules continue hierarchical modeling at Step 830, developing higher-order models to successively predict residuals left by previous models. This iterative approach ensures that small irregular trends are captured accurately.

At Step 832, the ModelSerializationModule serializes the developed models for efficient storage and retrieval. This serialization ensures that models can be easily accessed and applied to new data using formats like PMML or ONNX. The ClassificationModule then classifies new data points at Step 834, determining the relevant trend cluster by comparing the new data to historical patterns.

The ModelSelectionAndLoadingModule selects and loads the appropriate predictive model at Step 836, ensuring the correct model is applied for anomaly detection. At Step 838, the ComparisonModule compares the classified data point against the expected pattern predicted by the model, identifying any deviations. The AnomalyDetectionModule determines whether the data point is an anomaly at Step 840, using statistical tests, machine learning classifiers, or ensemble methods to identify significant deviations from expected patterns.

If an anomaly is detected, the AutomatedResponseModule generates an automated response at Step 842. This response may include sending alerts or initiating remedial actions, providing notifications via email, SMS, or system logs, and triggering automated workflows or corrective actions to mitigate potential issues. If no anomaly is detected, the MonitoringModule concludes the process at Step 844 without further action. This module allows the system to continue monitoring and analyzing incoming data in real-time, ensuring continuous surveillance and anomaly detection capabilities.

Figure 9:
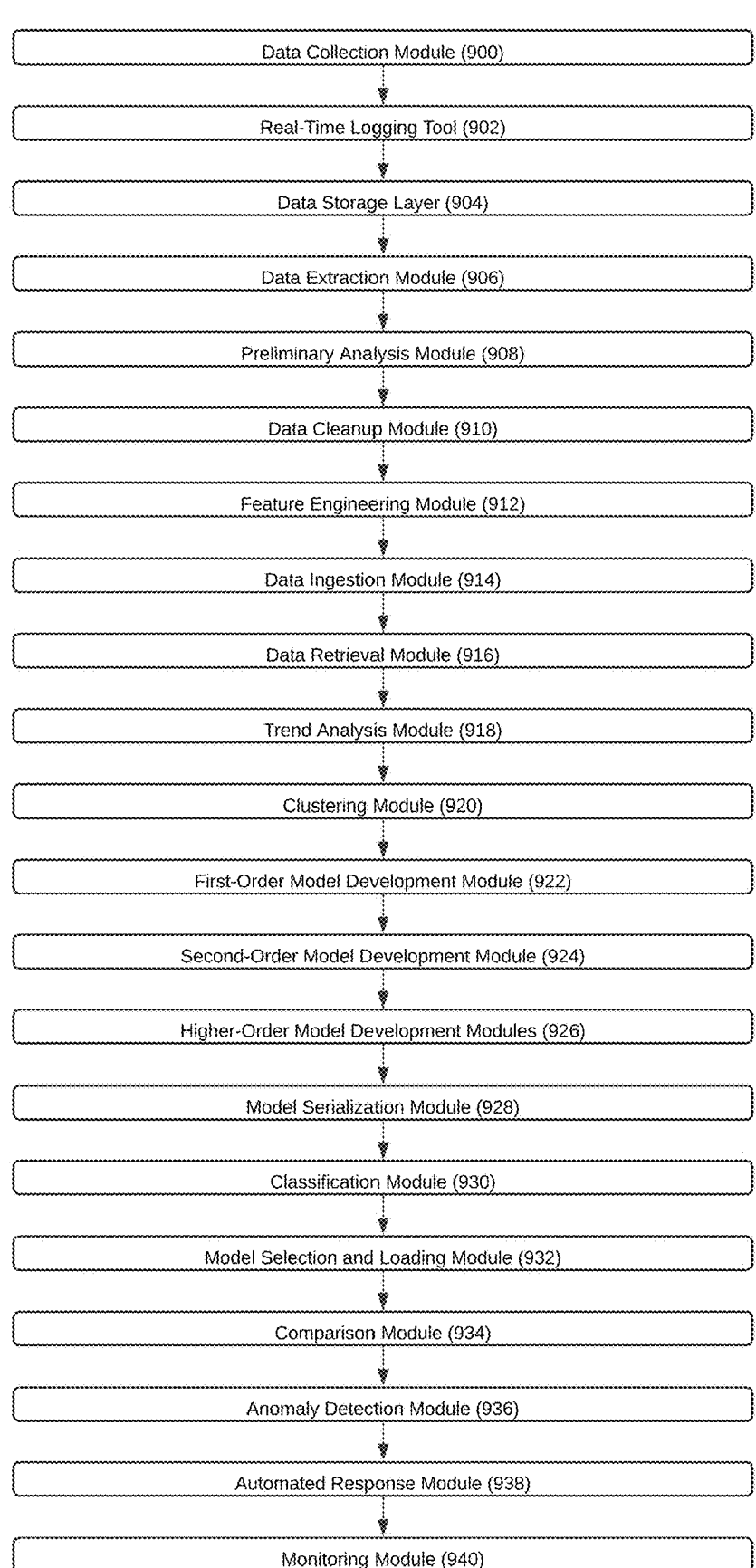
FIG. 9 a detailed cloud architecture for the second aspect of the invention, detailing a comprehensive system for data collection, preprocessing, model development, and anomaly detection.

FIG. 9 is a cloud architecture diagram illustrating exemplary aspects of the second invention that outlines a detailed, step-by-step system for comprehensive data processing, model development, and anomaly detection.

The cloud architecture diagram for the second invention provides a detailed and comprehensive system for detecting anomalies in time series data exhibiting irregular trends. The architecture consists of a sequence of interconnected modules, each playing a critical role in the data processing, analysis, and anomaly detection workflow.

The process begins with the Data Collection Module, labeled as element 900. This module is designed to gather data from a wide range of sources, including Internet of Things (IoT) devices, transaction logs, social media feeds, weather sensors, and financial market data. The diversity of data sources ensures a rich and comprehensive dataset, capturing various aspects of the system being monitored. The data collection is performed continuously or at scheduled intervals, depending on the application's requirements, to ensure that the most up-to-date information is always available for analysis.

Once collected, the data is passed to the Real-Time Logging Tool, element 902. This tool is responsible for logging each data point in real-time, capturing precise timestamps to maintain the temporal integrity of the dataset. Accurate logging is crucial for time series analysis, as it ensures that the sequence and timing of events are correctly preserved. The Real-Time Logging Tool utilizes high-performance logging systems capable of handling large volumes of data, ensuring that no data points are lost or incorrectly ordered during the logging process.

The logged data is then securely stored in the Data Storage Layer, labeled as element 904. This layer comprises scalable storage solutions, such as cloud-based storage services or distributed file systems, capable of efficiently managing large datasets. The storage system is optimized for both write and read operations, enabling quick data retrieval for subsequent processing stages. Data redundancy and backup mechanisms are also implemented to ensure data integrity and availability.

Next, the Data Extraction Module, element 906, processes the logged data by filtering and isolating relevant information. This module removes redundant or irrelevant data entries, focusing on critical metrics necessary for further analysis. The extraction process employs advanced filtering techniques, such as significance tests, range checks, and duplication removal, to enhance the quality and relevance of the extracted data. By isolating pertinent data points, this module ensures that only the most valuable information is passed on to the next stage.

The Preliminary Analysis Module, labeled as element 908, then performs an initial examination of the extracted data. This module uses statistical methods and visual inspection techniques to identify any apparent patterns or anomalies, establishing a baseline understanding of the dataset. Preliminary analysis methods include calculating basic statistics like mean, median, and standard deviation, as well as generating visualizations such as histograms, scatter plots, and time-series graphs. These initial insights help guide more detailed analyses and model development in subsequent stages.

Following the preliminary analysis, the data undergoes a cleaning process in the Data Cleanup Module, labeled as element 910. This module ensures that the dataset is accurate, consistent, and reliable by performing several data preprocessing tasks. Outlier removal techniques identify and exclude extreme values that could skew the analysis, while interpolation methods fill in missing data points to create a continuous dataset. Normalization procedures standardize data scales, ensuring that all variables are comparable and suitable for machine learning algorithms. The data cleanup process is crucial for maintaining the integrity of the dataset and improving the performance of subsequent analyses.

The cleaned data is then transformed into a structured format through the Feature Engineering Module, labeled as element 912. This module identifies and creates significant features that highlight important attributes for machine learning models. Feature engineering involves creating new variables that capture essential aspects of the data, such as aggregating data points over specific time intervals, calculating derived metrics, and encoding categorical variables into numerical formats. Effective feature engineering is critical for improving the predictive power of machine learning models, as it ensures that the models have access to the most informative and relevant features.

The engineered features are then ingested into the primary storage system via the Data Ingestion Module, labeled as element 914. This module organizes the data for efficient access and retrieval, utilizing big data frameworks like Hadoop, Spark, or cloud-based storage solutions. The data ingestion process involves formatting the data to ensure compatibility with various analysis and modeling tools, as well as indexing the data to enable fast query and retrieval operations. This organized storage system serves as the foundation for all subsequent data processing and analysis activities.

The Data Retrieval Module, labeled as element 916, accesses the stored data for detailed trend analysis. This module employs sophisticated algorithms to detect regularities and irregularities within the data, retrieving specific datasets as needed. Data retrieval methods include SQL queries, API calls, and other data access techniques that ensure accurate and timely retrieval of the required information. The retrieved data is then analyzed to identify unique trends and patterns, using advanced time-series analysis techniques in the Trend Analysis Module, labeled as element 918. Techniques such as moving averages, seasonal decomposition, and Fourier transforms are applied to uncover underlying patterns and periodicities in the data. Understanding these trends is essential for distinguishing between expected variations and genuine anomalies.

Once trends are identified, the data is categorized into distinct segments representing different patterns using the Clustering Module, labeled as element 920. Clustering methods, such as K-means, hierarchical clustering, or DBSCAN, group similar data points based on their characteristics, creating clusters that represent unique patterns influenced by various factors. Clustering helps manage the complexity of the data by breaking it down into more manageable segments, each with its own unique characteristics. This categorization allows the system to tailor its analysis and modeling efforts to the specific behavior of each cluster, enhancing the accuracy and relevance of the results.

For each identified cluster, specific predictive models are developed in the First-Order Model Development Module, labeled as element 922. This module uses machine learning models like linear regression or ARIMA to predict general trends or specific values within the data. These first-order models capture the primary patterns in the data, providing a baseline prediction that can be further refined. The Second-Order Model Development Module, labeled as element 924, builds on the first-order models by predicting the differences or residuals identified by the initial models. More complex models, such as Random Forest or Gradient Boosting, are employed to capture additional patterns and nuances in the data. The hierarchical modeling process continues with higher-order models in the Higher-Order Model Development Modules, labeled as element 926, successively predicting residuals left by previous models. This iterative refinement ensures that even small irregular trends are accurately captured, enhancing the overall predictive accuracy of the system.

The developed models are serialized for efficient storage and retrieval in the Model Serialization Module, labeled as element 928. This module uses formats like PMML (Predictive Model Markup Language) or ONNX (Open Neural Network Exchange) to serialize the models, facilitating interoperability and easy integration with various deployment environments. Serialized models can be quickly loaded and applied to new data, ensuring that the system remains responsive and efficient.

New data points are classified to determine their relevant trend cluster by comparing them to historical data patterns using the Classification Module, labeled as element 930. This module employs supervised learning algorithms, such as decision trees or support vector machines, to assign new data points to the correct cluster. Accurate classification is essential for ensuring that the appropriate predictive model is applied to each data point.

The Model Selection and Loading Module, labeled as element 932, selects and loads the appropriate predictive model for the classified data point based on the identified trend cluster. This module ensures that the correct model is applied for anomaly detection, dynamically linking data points with their respective models to maintain accuracy and efficiency.

The Comparison Module, labeled as element 934, compares the classified data point against the expected pattern predicted by the model. This module calculates residuals and applies threshold criteria to identify deviations from the expected behavior, determining whether a data point is an anomaly. Significant deviations are identified using the Anomaly Detection Module, labeled as element 936, which employs statistical tests, machine learning classifiers, or ensemble methods to ensure robust detection.

If an anomaly is detected, the Automated Response Module, labeled as element 938, generates an automated response. This response may include sending alerts via email, SMS, or system logs, and triggering automated workflows or corrective actions to mitigate potential issues. The automated response system ensures that anomalies are addressed promptly and effectively, minimizing the impact on the monitored system.

If no anomaly is detected, the Monitoring Module, labeled as element 940, concludes the process without further action. This module allows the system to continue monitoring and analyzing incoming data in real-time, ensuring continuous surveillance and anomaly detection capabilities. The monitoring process is ongoing, with the system constantly updating its models and analysis techniques to adapt to new data patterns and trends.

Overall, this cloud architecture diagram represents a comprehensive and detailed system for anomaly detection in time series data. By leveraging advanced machine learning techniques and structured data processing workflows, the system achieves high accuracy and reliability in identifying and responding to anomalies. Each module in the architecture plays a critical role in ensuring that the data is processed, analyzed, and acted upon efficiently, providing a robust solution for managing complex time series data with irregular trends.

Regarding pseudocode, exemplary code for implementing the first aspect of the invention can be considered as follows.

```
# Initialize modules and data structures
data_collection_module = DataCollectionModule( )
real_time_logging_tool = RealTimeLoggingTool( )
extraction_module = ExtractionModule( )
data_cleanup_module = DataCleanupModule( )
feature_engineering_module = FeatureEngineeringModule( )
data_ingestion_module = DataIngestionModule( )
trend_analysis_module = TrendAnalysisModule( )
clustering_module = ClusteringModule( )
model_development_module = ModelDevelopmentModule( )
model_serialization_module = ModelSerializationModule( )
classification_module = ClassificationModule( )
anomaly_detection_module = AnomalyDetectionModule( )
automated_response_module = AutomatedResponseModule( )
# Step 1: Data Collection
data = data_collection_module.collect_data(sources=['IoT devices', 'transaction logs', 'sensor networks'])
# Step 2: Real-time Data Logging
logged_data = real_time_logging_tool.log_data(data)
# Step 3: Data Extraction
relevant_data = extraction_module.filter_and_isolate(logged_data, criteria=['critical metrics'])
# Step 4: Preliminary Data Analysis
initial_patterns = extraction_module.preliminary_analysis(relevant_data)
# Step 5: Data Cleanup
cleaned_data =
data_cleanup_module.remove_noise_and_irrelevant_info(initial_patterns)
# Step 6: Feature Engineering
features = feature_engineering_module.create_features(cleaned_data)
# Step 7: Data Ingestion
data_ingestion_module.ingest_data(features)
```

-continued

```
# Step 8: Trend Analysis
trends = trend_analysis_module.analyze_trends(features, influencers=['holidays',
'weekends'])
# Step 9: Clustering Data
clusters = clustering_module.cluster_data(trends)
# Step 10: Model Development
models = [ ]
for cluster in clusters:
    model = model_development_module.develop_model(cluster)
    serialized_model = model_serialization_module.serialize_model(model)
    models.append(serialized_model)
# Step 11: Classification of New Data Points
new_data_points = data_collection_module.collect_data(sources=['new IoT data',
'new transaction logs'])
for data_point in new_data_points:
    classified_cluster = classification_module.classify_data_point(data_point, clusters)
    selected_model =
model_serialization_module.load_model(models[classified_cluster])
    anomaly = anomaly_detection_module.detect_anomaly(data_point,
selected_model)
    # Step 12: Automated Response
    if anomaly:
        automated_response_module.generate_response(anomaly)
    else:
        continue # Continue monitoring
# End of Pseudocode
```

The foregoing first pseudocode for detecting anomalies in time series data with irregular trends begins by initializing various modules and data structures necessary for the process. These modules include those for data collection, real-time logging, data extraction, data cleanup, feature engineering, data ingestion, trend analysis, clustering, model development, model serialization, classification, anomaly detection, and automated response generation. Each module is designed to perform specific tasks that contribute to the overall goal of accurately detecting anomalies in complex time series data.

Data collection is the initial step, where the DataCollectionModule gathers data from various sources such as IoT devices, transaction logs, and sensor networks. This step ensures comprehensive data capture, providing a diverse and rich dataset for subsequent analysis. The collected data is then logged in real-time using the RealTimeLoggingTool, which maintains the temporal integrity of the data. This real-time logging is crucial for accurate sequence analysis, as it captures every data point with precise timestamps, allowing for a detailed chronological record of events.

Following data logging, the ExtractionModule filters and isolates relevant data from the logged data, focusing on critical metrics necessary for further analysis. This step involves removing redundant or irrelevant data entries, ensuring that only the most pertinent information is processed in subsequent stages. The preliminary analysis is performed on the extracted data using statistical methods and visual inspections to identify initial patterns or anomalies. This preliminary analysis establishes a baseline understanding of the data set's characteristics, helping to inform later stages of the analysis.

The next phase involves data cleanup, where the DataCleanupModule removes noise and irrelevant information from the extracted data. This cleanup process is essential to ensure the dataset's accuracy and reliability for feature engineering and subsequent analysis. Methods such as outlier removal, interpolation to fill in missing values, and normalization to standardize data scales are employed to refine the data. By eliminating extraneous elements, the data is made more suitable for detailed analysis and modeling.

Feature engineering follows, where the FeatureEngineeringModule transforms the cleaned data into a structured format that highlights significant attributes and properties for machine learning algorithms. This step includes creating new variables, aggregating data points, and encoding categorical variables into numerical formats. Effective feature engineering is critical, as it enhances the machine learning models' ability to identify and learn from relevant patterns in the data. This transformation helps to expose underlying trends and relationships that might not be immediately apparent in the raw data.

The engineered features are then ingested into the primary data source using the DataIngestionModule. This step involves organizing the data for efficient retrieval and analysis, typically storing it in a database or data warehouse. The data ingestion process ensures that the structured data is easily accessible for the trend analysis phase. The stored data is retrieved for detailed trend analysis using sophisticated algorithms within the TrendAnalysisModule. This analysis aims to detect regularities and irregularities within the data, considering external influencers such as holidays and weekends. Techniques like moving averages, seasonal decomposition, and Fourier transforms are applied to uncover hidden patterns and trends.

Based on the identified trend influencers, the ClusteringModule categorizes the data into distinct segments representing different patterns. Clustering involves grouping similar data points using methods such as K-means clustering, hierarchical clustering, or DBSCAN (Density-Based Spatial Clustering of Applications with Noise). This segmentation helps in managing and analyzing data with varying characteristics more effectively. For each identified trend cluster, specific predictive models are developed using the ModelDevelopmentModule. These models are tailored to recognize the unique characteristics of each segment, allowing for more accurate predictions and anomaly detection.

The developed predictive models are serialized for efficient storage and retrieval using the ModelSerializationModule. Serialization formats like PMML (Predictive Model Markup Language) or ONNX (Open Neural Network Exchange) are used to ensure that models can be easily accessed and applied to new data. This serialization process makes it possible to manage multiple models efficiently and apply the appropriate model to incoming data points.

New data points are continuously collected, and the ClassificationModule classifies these points to determine their relevant trend cluster by comparing them to historical data patterns. This classification process involves using supervised learning algorithms to assign new data points to the correct cluster based on their characteristics. Once classified, the appropriate predictive model for each data point is selected and loaded using the ModelSerialization-Module. The classified data point is then compared against the expected pattern predicted by the model to detect deviations. This comparison involves calculating residuals and applying threshold criteria to identify anomalies.

If a data point is determined to be an anomaly based on the comparison, the AnomalyDetectionModule identifies significant deviations from expected patterns. This module employs statistical tests, machine learning classifiers, or ensemble methods to ensure robust and reliable anomaly detection. When an anomaly is detected, the AutomatedResponseModule generates an appropriate response. This response may include sending alerts to relevant stakeholders or initiating remedial actions to address the anomaly. Automated responses are critical for promptly addressing anomalies, minimizing potential risks, and preventing further issues.

If no anomaly is detected, the system continues monitoring and analyzing incoming data, ensuring continuous surveillance and anomaly detection capabilities. This ongoing monitoring process is essential for maintaining the system's effectiveness and ensuring that any new anomalies are promptly identified and addressed.

Overall, this pseudocode provides a comprehensive framework for detecting anomalies in time series data with irregular trends. By leveraging advanced machine learning techniques, structured data processing workflows, and real-time analysis, the system achieves high accuracy and reliability in anomaly detection. The detailed and systematic approach ensures that all relevant trends and patterns are identified and analyzed, providing valuable insights and prompt responses to any detected anomalies. This robust framework is adaptable to various applications, making it a powerful tool for managing and analyzing complex time series data.

Second sample pseudocode for implementing the second aspect of the invention is as follows:

```
# Initialize modules and data structures
data_collection_module = DataCollectionModule( )
real_time_logging_tool = RealTimeLoggingTool( )
extraction_module = ExtractionModule( )
data_cleanup_module = DataCleanupModule( )
feature_engineering_module = FeatureEngineeringModule( )
data_ingestion_module = DataIngestionModule( )
trend_analysis_module = TrendAnalysisModule( )
clustering_module = ClusteringModule( )
model_development_module = ModelDevelopmentModule( )
model_serialization_module = ModelSerializationModule( )
classification_module = ClassificationModule( )
anomaly_detection_module = AnomalyDetectionModule( )
automated_response_module = AutomatedResponseModule( )
# Step 1: Data Collection
data = data_collection_module.collect_data(sources=['IoT devices', 'transaction logs',
'sensor networks'])
# Step 2: Real-time Data Logging
logged_data = real_time_logging_tool.log_data(data)
# Step 3: Data Extraction
relevant_data = extraction_module.filter_and_isolate(logged_data, criteria=['critical
metrics'])
# Step 4: Preliminary Data Analysis
initial_patterns = extraction_module.preliminary_analysis(relevant_data)
# Step 5: Data Cleanup
cleaned_data =
data_cleanup_module.remove_noise_and_irrelevant_info(initial_patterns)
# Step 6: Feature Engineering
features = feature_engineering_module.create_features(cleaned_data)
# Step 7: Data Ingestion
data_ingestion_module.ingest_data(features)
# Step 8: Trend Analysis
trends = trend_analysis_module.analyze_trends(features, influencers=['holidays',
'weekends'])
# Step 9: Clustering Data
clusters = clustering_module.cluster_data(trends)
# Step 10: First-Order Model Development
first_order_models = [ ]
for cluster in clusters:
    model = model_development_module.develop_first_order_model(cluster)
    serialized_model = model_serialization_module.serialize_model(model)
    first_order_models.append(serialized_model)
# Step 11: Higher-Order Model Development
higher_order_models = [ ]
for cluster in clusters:
    residuals = model_development_module.calculate_residuals(cluster,
first_order_models)
    second_order_model =
model_development_module.develop_second_order_model(residuals)
    serialized_second_order_model =
```

-continued

```
model_serialization_module.serialize_model(second_order_model)
   higher_order_models.append(serialized_second_order_model)
   # Continue developing higher-order models as needed
   current_residuals = residuals
   while
model_development_module.needs_higher_order_model(current_residuals):
      higher_order_model =
model_development_module.develop_higher_order_model(current_residuals)
      serialized_higher_order_model =
model_serialization_module.serialize_model(higher_order_model)
      higher_order_models.append(serialized_higher_order_model)
      current_residuals = model_development_module.calculate_residuals(cluster,
higher_order_model)
   # Step 12: Classification of New Data Points
   new_data_points = data_collection_module.collect_data(sources=['new IoT data',
'new transaction logs'])
   for data_point in new_data_points:
      classified_cluster = classification_module.classify_data_point(data_point, clusters)
      # Select and load appropriate models
      selected_first_order_model =
model_serialization_module.load_model(first_order_models[classified_cluster])
      selected_higher_order_models =
model_serialization_module.load_higher_order_models(higher_order_models [classi
fied_cluster])
      # Perform anomaly detection using hierarchical models
      anomaly = anomaly_detection_module.detect_anomaly(data_point,
selected_first_order_model, selected_higher_order_models)
      # Step 13: Automated Response
      if anomaly:
         automated_response_module.generate_response(anomaly)
      else:
         continue # Continue monitoring
   # End of Pseudocode
```

The second pseudocode for the second aspect of the invention can be understood as follows.

The pseudocode for the second invention begins by initializing various modules and data structures essential for accurate anomaly detection in complex time series data with irregular trends. These modules include data collection, real-time logging, data extraction, data cleanup, feature engineering, data ingestion, trend analysis, clustering, model development, model serialization, classification, anomaly detection, and automated response generation. Each module performs specific tasks that contribute to the overall goal of identifying anomalies with high precision.

The process starts with the DataCollectionModule, which gathers data from diverse sources such as IoT devices, transaction logs, and sensor networks. This step ensures comprehensive data capture, providing a rich dataset that reflects a wide range of operational conditions and external influences. Once collected, the data is logged in real-time using the RealTimeLoggingTool. Real-time logging is crucial for maintaining the temporal integrity of the data, capturing every data point with precise timestamps to allow for accurate sequence analysis. This logging process creates a detailed chronological record of events, which is essential for understanding the context of detected anomalies.

Following the data logging phase, the ExtractionModule filters and isolates relevant data from the logged dataset. This module focuses on extracting critical metrics necessary for further analysis, removing redundant or irrelevant data entries to streamline the dataset. This filtration ensures that only the most pertinent information is processed in subsequent stages. Preliminary analysis is then conducted on the extracted data using statistical methods and visual inspections. This initial analysis aims to identify obvious patterns or anomalies, establishing a baseline understanding of the dataset's characteristics. Techniques such as mean, median, standard deviation calculations, and visual plotting (e.g., histograms, scatter plots) are used to detect initial irregularities.

The next phase involves data cleanup, where the Data-CleanupModule removes noise and irrelevant information from the extracted data. This cleanup process is vital for ensuring the dataset's accuracy and reliability for feature engineering and subsequent analysis. Methods employed during this phase include outlier removal, interpolation to fill in missing values, and normalization to standardize data scales. Outlier removal helps in eliminating extreme values that could skew the analysis, while interpolation ensures continuity in the data, and normalization adjusts the scales of different data attributes to a common range.

Feature engineering follows, with the FeatureEngineeringModule transforming the cleaned data into a structured format that highlights significant attributes and properties for machine learning algorithms. This transformation includes creating new variables that capture relevant information, aggregating data points to summarize key metrics, and encoding categorical variables into numerical formats. For instance, categorical data such as "day of the week" might be encoded into numerical values, while time-based aggregations could summarize transaction volumes per hour. Effective feature engineering enhances the machine learning models' ability to identify and learn from relevant patterns in the data, exposing underlying trends and relationships that might not be immediately apparent.

The engineered features are then ingested into the primary data source using the DataIngestionModule. This step involves organizing the data for efficient retrieval and analysis, typically storing it in a database or data warehouse. The data ingestion process ensures that the structured data is easily accessible for the trend analysis phase. Sophisticated algorithms within the TrendAnalysisModule are then used to analyze the stored data, detecting regularities and irregularities. This analysis considers external influencers such as holidays and weekends, applying techniques like moving averages, seasonal decomposition, and Fourier transforms to uncover hidden patterns and trends. For example, seasonal decomposition can separate the data into trend, seasonal, and residual components, making it easier to identify anomalies.

Based on the identified trend influencers, the Clustering-Module categorizes the data into distinct segments representing different patterns. Clustering involves grouping similar data points using methods such as K-means clustering, hierarchical clustering, or DBSCAN (Density-Based Spatial Clustering of Applications with Noise). These methods help manage and analyze data with varying characteristics more effectively. For instance, K-means clustering partitions the data into k clusters by minimizing variance within each cluster, while hierarchical clustering creates a tree of clusters based on data similarity, and DBSCAN identifies clusters based on density.

For each identified trend cluster, first-order predictive models are developed using the ModelDevelopmentModule. These models predict the general trend or specific value within the data and are trained using methods like linear regression or ARIMA (AutoRegressive Integrated Moving Average). Linear regression models the relationship between the dependent variable and one or more independent variables, while ARIMA models account for autocorrelation in the time series data.

To address the residuals or differences left by the first-order models, second-order models are developed using more complex algorithms such as Random Forest or Gradient Boosting. Random Forest creates multiple decision trees and merges their results to improve accuracy and avoid overfitting, while Gradient Boosting builds models sequentially, each correcting the errors of its predecessor. This hierarchical modeling approach continues with higher-order models, each successively predicting the residuals left by the previous models. This iterative process ensures that even small irregular trends are captured accurately, enhancing the overall predictive accuracy and robustness of the system.

The developed predictive models are serialized for efficient storage and retrieval using the ModelSerialization-Module. Serialization formats like PMML (Predictive Model Markup Language) or ONNX (Open Neural Network Exchange) are used to ensure that models can be easily accessed and applied to new data. PMML is an XML-based standard for representing predictive models, enabling models to be shared between different applications, while ONNX is an open format for machine learning models that allows interoperability between various frameworks.

New data points are continuously collected, and the ClassificationModule classifies these points to determine their relevant trend cluster by comparing them to historical data patterns. This classification process involves using supervised learning algorithms to assign new data points to the correct cluster based on their characteristics. For instance, a new transaction log might be classified into a cluster representing weekend sales spikes. Once classified, the appropriate predictive model for each data point is selected and loaded using the ModelSerializationModule.

The classified data point is then compared against the expected pattern predicted by the model to detect deviations. This comparison involves calculating residuals, which are the differences between observed and predicted values, and applying threshold criteria to identify anomalies. The threshold criteria are set to determine what constitutes a significant deviation from the expected pattern.

If a data point is determined to be an anomaly based on the comparison, the AnomalyDetectionModule identifies significant deviations from expected patterns. This module employs statistical tests, machine learning classifiers, or ensemble methods to ensure robust and reliable anomaly detection. For example, statistical tests might include Z-scores or hypothesis testing, while machine learning classifiers could involve support vector machines or neural networks.

When an anomaly is detected, the AutomatedResponse-Module generates an appropriate response. This response may include sending alerts to relevant stakeholders or initiating remedial actions to address the anomaly. Alerts can be sent via email, SMS, or system logs, while remedial actions might involve triggering automated workflows or corrective measures. Automated responses are critical for promptly addressing anomalies, minimizing potential risks, and preventing further issues.

If no anomaly is detected, the system continues monitoring and analyzing incoming data, ensuring continuous surveillance and anomaly detection capabilities. This ongoing monitoring process is essential for maintaining the system's effectiveness and ensuring that any new anomalies are promptly identified and addressed.

Overall, this pseudocode provides a comprehensive framework for detecting anomalies in time series data with irregular trends. By leveraging advanced machine learning techniques, hierarchical modeling, and structured data processing workflows, the system achieves high accuracy and reliability in anomaly detection. The detailed and systematic approach ensures that all relevant trends and patterns are identified and analyzed, providing valuable insights and prompt responses to any detected anomalies. This robust framework is adaptable to various applications, making it a powerful tool for managing and analyzing complex time series data.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for detecting anomalies in time series data exhibiting irregular trends, comprising the steps of:
  collecting data at a data inception point using a data collection module, ensuring comprehensive data capture from various sources including IoT devices, transaction logs, and sensor networks;
  logging the collected data in real-time using a real-time logging tool to maintain temporal integrity and allow for accurate sequence analysis by capturing every data point with precise timestamps;
  extracting relevant data from the logged data by filtering and isolating key data points necessary for further analysis using an extraction module, which involves removing redundant or irrelevant data entries and focusing on critical metrics;
  performing preliminary analysis on the extracted data with an analysis module to identify any obvious patterns or anomalies and establish a baseline understanding, using statistical methods and visual inspections;

cleaning the extracted data using a data cleanup module to remove noise and irrelevant information, ensuring that the data used for feature engineering and analysis is accurate and reliable, involving methods such as outlier removal, interpolation to fill missing values, and normalization to standardize data scales;

engineering features from the cleaned data by transforming raw data into a structured format that highlights significant attributes and properties for machine learning algorithms using a feature engineering module, including creating new variables, aggregating data points, and encoding categorical variables into numerical format;

ingesting the engineered features into a storage and primary data source for organized and efficient retrieval using a data ingestion module, ensuring that the data is formatted and stored in a database or data warehouse for easy access;

retrieving the stored data for detailed trend analysis using sophisticated algorithms to detect regularities and irregularities with a data retrieval module, employing SQL queries or API calls to access specific datasets;

identifying unique trends and patterns within the data by analyzing temporal sequences and external influencers such as holidays or weekends using a trend analysis module, applying time-series analysis techniques like moving averages, seasonal decomposition, and Fourier transforms;

clustering the data based on identified trend influencers to categorize the data into distinct segments representing different patterns using a clustering module, which can include methods such as K-means clustering, hierarchical clustering, or DBSCAN to group similar data points;

developing a first-order predictive model to predict the general trend or specific value within the data using a model development module, training machine learning models such as linear regression or AutoRegressive Integrated Moving Average (ARIMA);

developing a second-order predictive model to predict the differences identified by the first-order model using a second-order model development module, employing more complex models such as Random Forest or Gradient Boosting to capture residual patterns specific to each cluster based on the identified trend influencers including holidays or weekends;

continuing hierarchical modeling with higher-order models to successively predict residuals left by previous models using higher-order model development modules, ensuring that even small irregular trends are captured accurately by iterative refinements for each cluster based on the identified trend influencers including holidays or weekends;

serializing the predictive models for efficient storage and retrieval, ensuring that models can be easily accessed and applied to new data using a model serialization module, utilizing formats like PMML (Predictive Model Markup Language) or ONNX (Open Neural Network Exchange) to facilitate interoperability;

classifying new data points to determine a relevant trend cluster by comparing them to historical data patterns using a classification module, employing supervised learning algorithms such as decision trees or support vector machines to assign new data points to a correct cluster;

selecting and loading an appropriate predictive model for the classified data point based on the identified trend cluster using a model selection and loading module, ensuring a correct model is applied for anomaly detection by dynamically linking data points with their respective models;

comparing the classified data point against an expected pattern predicted by the model to detect deviations using a comparison module, involving calculating residuals and applying threshold criteria to identify anomalies;

determining whether the data point is an anomaly based on the comparison, identifying significant deviations from expected patterns using an anomaly detection module, which may involve statistical tests, machine learning classifiers, or ensemble methods to ensure robust detection;

generating an automated response if an anomaly is detected, which may include sending alerts or initiating remedial actions using an automated response module, providing notifications via email, short message service (SMS), or system logs, and triggering automated workflows or corrective actions to mitigate potential issues;

concluding without further action if no anomaly is detected, allowing the system to continue monitoring and analyzing incoming data using a monitoring module, ensuring continuous surveillance and anomaly detection capabilities; and continuously updating and refining the first-order, second-order, and higher-order predictive models based on latest data patterns and trends using the model development module to ensure adaptability and accuracy over time, leveraging continuous learning algorithms to keep the models current and effective for each cluster.

2. A method for detecting anomalies in time series data exhibiting irregular trends, comprising:

collecting data at a data inception point using a data collection module, ensuring comprehensive data capture from various sources, including Internet of Things (IOT) devices, transaction logs, and sensor networks, to provide a diverse dataset for robust analysis;

logging the collected data in real-time using a real-time logging tool to maintain temporal integrity and allow for accurate sequence analysis, capturing every data point with precise timestamps to create a reliable time series;

extracting relevant data from the logged data by filtering and isolating key data points necessary for further analysis using an extraction module, removing redundant or irrelevant data entries and focusing on critical metrics including transaction amounts, device activity levels, and sensor readings;

performing preliminary analysis on the extracted data with an analysis module to identify obvious patterns or anomalies and establish a baseline understanding, using statistical methods including mean, median, and standard deviation, and visual inspections through graphs and charts;

cleaning the extracted data using a data cleanup module to remove noise and irrelevant information, ensuring the data used for feature engineering and analysis is accurate and reliable, by applying methods including outlier removal, interpolation to fill missing values, and normalization to standardize data scales;

engineering features from the cleaned data by transforming raw data into a structured format that highlights significant attributes and properties for machine learning algorithms using a feature engineering module, including creating new variables, aggregating data points, and encoding categorical variables into numerical format;

ingesting the engineered features into a storage and primary data source for organized and efficient retrieval using a data ingestion module, formatting and storing the data in a database or data warehouse for easy access and retrieval;

retrieving the stored data for detailed trend analysis using sophisticated algorithms to detect regularities and irregularities with a data retrieval module, employing SQL queries or API calls to access specific datasets efficiently;

identifying unique trends and patterns within the retrieved data by analyzing temporal sequences and external influencers including holidays or weekends using a trend analysis module, applying time-series analysis techniques including moving averages, seasonal decomposition, and Fourier transforms to uncover hidden patterns;

clustering the retrieved data based on the identified trend influencers to categorize the data into distinct segments representing different patterns using a clustering module, applying methods including K-means clustering, hierarchical clustering, or Density-Based Spatial Clustering of Applications with Noise (DBSCAN) to group similar data points;

developing a first-order predictive model for each distinct segment to predict a general trend or specific value within the data using a model development module, training machine learning models including linear regression or AutoRegressive Integrated Moving Average (ARIMA) to capture an overall trend specific to each distinct segment based on the identified trend influencers including holidays or weekends;

developing a second-order predictive model for each distinct segment to predict differences identified by the first-order predictive model using a second-order model development module, employing machine learning models including Random Forest or Gradient Boosting to capture residual patterns specific to each distinct segment based on the identified trend influencers including holidays or weekends;

continuing hierarchical modeling with higher-order predictive models for each distinct segment to successively predict residuals left by previous models using higher-order model development modules, ensuring small irregular trends are captured accurately by iterative refinements specific to each distinct segment based on the identified trend influencers including holidays or weekends;

serializing the first-order, second-order, and higher-order predictive models for efficient storage and retrieval using a model serialization module, utilizing formats including Predictive Model Markup Language (PMML) or Open Neural Network Exchange (ONNX) to facilitate interoperability;

classifying new data points to determine a relevant distinct segment by comparing the new data points to historical data patterns using a classification module, employing supervised learning algorithms including decision trees or support vector machines to assign the new data points to a correct distinct segment;

selecting and loading an appropriate predictive model for each classified data point based on the relevant distinct segment using a model selection and loading module, ensuring a correct model specific to the identified trend influencers is applied for anomaly detection by dynamically linking the classified data point with the appropriate predictive model;

comparing each classified data point against an expected pattern predicted by the selected predictive model to detect deviations using a comparison module, calculating residuals and applying threshold criteria to identify anomalies;

determining whether each classified data point is an anomaly based on the comparison, identifying significant deviations from expected patterns using an anomaly detection module, applying statistical tests, machine learning classifiers, or ensemble methods to ensure robust detection;

generating an automated response if an anomaly is detected, including sending alerts or initiating remedial actions using an automated response module, providing notifications via email, Short Message Service (SMS), or system logs, and triggering automated workflows or corrective actions to mitigate potential issues;

concluding without further action if no anomaly is detected, allowing continuous monitoring and analyzing of incoming data using a monitoring module, ensuring continuous surveillance and anomaly detection capabilities; and continuously updating and refining the first-order, second-order, and higher-order predictive models based on latest data patterns and trends using the model development module to ensure adaptability and accuracy over time, leveraging continuous learning algorithms to keep the models current and effective for each distinct segment.

3. The method of claim 2, wherein the data collection module collects data from diverse sources including social media feeds, weather sensors, and financial market data, ensuring an enriched dataset for comprehensive analysis.

4. The method of claim 3, wherein the extraction module applies advanced filtering techniques to remove redundant or irrelevant data entries, enhancing the quality and relevance of the extracted data by applying filters including range checks, duplication removal, and significance tests.

5. The method of claim 4, wherein the preliminary analysis includes utilizing statistical methods and visual inspections within the analysis module to identify initial irregularities in the extracted data, providing an early indication of potential anomalies through techniques including histogram analysis, scatter plots, and time-series plotting.

6. The method of claim 5, wherein the data cleanup step involves performing outlier removal, interpolation, and normalization using the data cleanup module to refine the data, ensuring the dataset is pristine and ready for feature engineering by addressing inconsistencies or gaps in the data through methods including Z-score filtering, linear interpolation, and min-max scaling.

7. The method of claim 6, wherein the feature engineering step includes creating new variables, aggregating data points, and encoding categorical variables using the feature engineering module to enhance the data for machine learning algorithms, leveraging domain-specific transformations and interactions to extract meaningful features including time-based aggregations, one-hot encoding, and polynomial feature creation.

8. The method of claim 7, wherein the trend analysis step involves applying time-series analysis techniques including moving averages, seasonal decomposition, and Fourier transforms using the trend analysis module to detect unique trends, enabling accurate identification and characterization of patterns over time, including techniques like exponential smoothing, Seasonal and Trend decomposition using Loess (STL) decomposition, and frequency domain analysis.

9. The method of claim 8, wherein clustering the retrieved data includes applying clustering methods including K-means clustering, hierarchical clustering, or Density-Based Spatial Clustering of Applications with Noise (DB-SCAN) within the clustering module to group similar data points, facilitating identification of distinct patterns and trends within the data, and optimizing cluster parameters using methods including silhouette analysis, dendrograms, and density-based spatial clustering.

10. The method of claim 9, wherein the step of developing higher-order predictive models involves applying ensemble methods within the higher-order model development modules to enhance accuracy and robustness of the predictive models, ensuring that minor irregular trends are captured effectively by combining multiple models through techniques including bagging, boosting, and stacking.

11. The method of claim 10, wherein the automated response step includes sending alerts via email, Short Message Service (SMS), or system logs, and triggering automated workflows or corrective actions using the automated response module, ensuring swift and effective responses to potential issues based on the nature and severity of the detected anomaly by integrating with incident management systems and automated resolution protocols.

12. A method for detecting anomalies in time series data exhibiting irregular trends, comprising:

collecting data at a data inception point using a data collection module, ensuring comprehensive data capture from various sources including Internet of Things (IOT) devices, transaction logs, sensor networks, social media feeds, weather sensors, and financial market data, to provide a diverse and holistic dataset for robust analysis, wherein the data collection module gathers data reflecting a wide range of operational conditions and external influences;

logging the collected data in real-time using a real-time logging tool to maintain temporal integrity and allow for accurate sequence analysis, capturing every data point with precise timestamps to create a reliable time series, wherein the real-time logging tool creates a detailed chronological record of events essential for understanding the context of detected anomalies;

filtering the collected data to isolate pertinent information before logging using a data filtering module, applying advanced filtering techniques including range checks, duplication removal, and significance tests to enhance data quality;

extracting relevant data from the logged data by filtering and isolating key data points necessary for further analysis using an extraction module, removing redundant or irrelevant data entries and focusing on critical metrics including transaction amounts, device activity levels, and sensor readings, wherein the extraction module streamlines the dataset by focusing on pertinent information for subsequent stages;

performing preliminary analysis on the extracted data with an analysis module to identify obvious patterns or anomalies and establish a baseline understanding, using statistical methods including mean, median, and standard deviation, and visual inspections through techniques including histogram analysis, scatter plots, and time-series plotting, wherein the preliminary analysis detects initial irregularities to provide an early indication of potential anomalies;

cleaning the extracted data using a data cleanup module to remove noise and irrelevant information, ensuring the data used for feature engineering and analysis is accurate and reliable, by applying methods including outlier removal through Z-score filtering, interpolation through linear interpolation, and normalization through min-max scaling to standardize data scales, wherein the data cleanup module eliminates extreme values that could skew the analysis, ensures continuity in the data, and adjusts scales of different data attributes to a common range;

engineering features from the cleaned data by transforming raw data into a structured format that highlights significant attributes and properties for machine learning algorithms using a feature engineering module, including creating new variables that capture relevant information, aggregating data points over specific time intervals, encoding categorical variables into numerical format such as one-hot encoding for day of the week, and applying domain-specific transformations including time-based aggregations, one-hot encoding, and polynomial feature creation, wherein the feature engineering module exposes underlying trends and relationships not immediately apparent in the raw data;

ingesting the engineered features into a primary storage source using a data ingestion module, formatting and storing the data in a database or data warehouse compatible with big data frameworks including Hadoop or Spark for organized and efficient retrieval, wherein the data ingestion module organizes the data for easy access in the trend analysis phase;

retrieving the stored data for detailed trend analysis using sophisticated algorithms to detect regularities and irregularities with a data retrieval module, employing SQL queries or API calls to access specific datasets efficiently;

identifying unique trends and patterns within the retrieved data by analyzing temporal sequences and external influencers including holidays or weekends using a trend analysis module, applying time-series analysis techniques including moving averages, seasonal decomposition through Seasonal and Trend decomposition using Loess (STL), Fourier transforms, exponential smoothing, and frequency domain analysis to uncover hidden patterns, wherein the trend analysis module separates the data into trend, seasonal, and residual components to facilitate anomaly identification;

clustering the retrieved data into micro-clusters based on intersections of different trends influenced by the external influencers including holidays or weekends using a clustering module, applying clustering methods including K-means clustering by minimizing variance within each cluster, hierarchical clustering to create a tree of clusters based on data similarity, Gaussian Mixture Models, or Density-Based Spatial Clustering of Applications with Noise (DBSCAN) to identify clusters based on density, and optimizing cluster parameters using silhouette analysis, dendrograms, and density-based spatial clustering to group similar data points, wherein the clustering module manages and analyzes data with varying characteristics more effectively;

developing a first-order predictive model for each micro-cluster to predict a general trend or specific value within the data using a model development module, training machine learning models including linear regression to model relationships between variables, AutoRegressive Integrated Moving Average (ARIMA) to account for autocorrelation in time series data, or neural networks to capture an overall trend specific to each micro-cluster based on the external influencers;

developing a second-order predictive model for each micro-cluster to predict differences identified by the first-order predictive model using a second-order model development module, employing machine learning models including Random Forest to create multiple decision trees and merge results for improved accuracy and avoidance of overfitting, or Gradient Boosting to build models sequentially with each correcting errors of its predecessor, to capture residual patterns specific to each micro-cluster based on the external influencers;

continuing hierarchical modeling with higher-order predictive models for each micro-cluster to successively predict residuals left by previous models using higher-order model development modules, ensuring small irregular trends are captured accurately by iterative refinements specific to each micro-cluster based on the external influencers including holidays or weekends, wherein the higher-order model development modules apply ensemble methods including bagging, boosting, and stacking to enhance accuracy and robustness by combining multiple models;

serializing the first-order, second-order, and higher-order predictive models for efficient storage and retrieval using a model serialization module, utilizing formats including Predictive Model Markup Language (PMML) as an XML-based standard for representing predictive models to enable sharing between applications, or Open Neural Network Exchange (ONNX) for interoperability between various frameworks, to facilitate interoperability and cross-platform deployment;

classifying new data points to determine a relevant micro-cluster by comparing the new data points to historical data patterns using a classification module, employing supervised learning algorithms including decision trees, support vector machines, or nearest neighbors to assign the new data points to a correct micro-cluster; based on characteristics such as weekend sales spikes;

selecting and loading an appropriate predictive model for each classified data point based on the relevant micro-cluster using a model selection and loading module, ensuring a correct model specific to the external influencers is applied for anomaly detection by dynamically linking the classified data point with the appropriate predictive model;

comparing each classified data point against an expected pattern predicted by the selected predictive model to detect deviations using a comparison module, calculating residuals as differences between observed and predicted values and applying threshold criteria to identify anomalies, wherein the threshold criteria determine significant deviations from the expected pattern;

determining whether each classified data point is an anomaly based on the comparison, identifying significant deviations from expected patterns using an anomaly detection module, applying statistical tests including Z-scores or hypothesis testing, machine learning classifiers including support vector machines or neural networks, or ensemble methods to ensure robust detection;

generating an automated response if an anomaly is detected, including sending alerts or initiating remedial actions using an automated response module, providing notifications via email, Short Message Service (SMS), or system logs, and triggering automated workflows or corrective actions through integration with incident management systems and automated resolution protocols to mitigate potential issues; based on the nature and severity of the anomaly;

continuously updating and refining the first-order, second-order, and higher-order predictive models based on latest data patterns and trends using the model development module to ensure adaptability and accuracy over time, wherein the model development module implements continuous model retraining pipelines;

leveraging continuous learning algorithms to keep the first-order, second-order, and higher-order predictive models current and effective for each micro-cluster, including delivering artificial intelligence enhancements over time through iterative processes; and concluding without further action if no anomaly is detected, allowing continuous monitoring and analyzing of incoming data using a monitoring module, ensuring continuous surveillance and anomaly detection capabilities, wherein the monitoring module maintains ongoing effectiveness by promptly identifying and addressing new anomalies.

13. A computer-implemented method for detecting anomalies in time series data exhibiting irregular trends performed by a computing device that includes a processor and a non-volatile memory storing computer-executable instructions, the method comprising:

collecting, by a data collection module, data at a data inception point, ensuring comprehensive capture of the data from various sources including Internet of Things (IOT) devices, transaction logs, sensor networks, social media feeds, weather sensors, and financial market data, to provide a diverse and holistic dataset for robust analysis;

logging, by a real-time logging tool, the collected data in real-time to maintain temporal integrity of the collected data and allow for accurate sequence analysis of the collected data, capturing every data point with precise timestamps to create a reliable time series;

filtering, by a data filtering module, the collected data to isolate pertinent information before logging the collected data, applying advanced filtering techniques including range checks, duplication removal, and significance tests to enhance quality of the collected data;

extracting, by an extraction module, relevant data from the logged data by filtering and isolating key data points necessary for further analysis, removing redundant or irrelevant data entries and focusing on critical metrics including transaction amounts, device activity levels, and sensor readings;

performing, by an analysis module, preliminary analysis on the extracted data to identify obvious patterns or anomalies in the extracted data and establish a baseline understanding of the extracted data, using statistical methods including mean, median, and standard deviation, and visual inspections through techniques including histogram analysis, scatter plots, and time-series plotting;

cleaning, by a data cleanup module, the extracted data to remove noise and irrelevant information from the extracted data, ensuring that the data used for feature engineering and analysis is accurate and reliable, by applying methods including outlier removal through Z-score filtering, interpolation through linear interpolation, and normalization through min-max scaling to standardize data scales;

engineering, by a feature engineering module, features from the cleaned data by transforming raw data into a structured format that highlights significant attributes and properties for machine learning algorithms, including creating new variables, aggregating data points over specific time intervals, encoding categorical variables into numerical format, and applying domain-specific transformations including time-based aggregations, one-hot encoding, and polynomial feature creation;

ingesting, by a data ingestion module, the engineered features into a primary storage source, formatting and storing the data in a database or data warehouse compatible with big data frameworks including Hadoop or Spark for organized and efficient retrieval;

retrieving, by a data retrieval module, the stored data for detailed trend analysis using sophisticated algorithms to detect regularities and irregularities in the stored data, employing SQL queries or API calls to access specific datasets efficiently;

identifying, by a trend analysis module, unique trends and patterns within the retrieved data by analyzing temporal sequences and external influencers including holidays or weekends, the trend analysis module employing a large language model to perform natural language processing and pattern recognition on the retrieved data, applying time-series analysis techniques including moving averages, seasonal decomposition through Seasonal and Trend decomposition using Loess (STL), Fourier transforms, exponential smoothing, and frequency domain analysis to uncover hidden patterns;

clustering, by a clustering module, the retrieved data into micro-clusters based on intersections of different trends influenced by the external influencers including holidays or weekends, applying clustering methods including K-means clustering, hierarchical clustering, Gaussian Mixture Models, or Density-Based Spatial Clustering of Applications with Noise (DBSCAN) and optimizing cluster parameters using silhouette analysis, dendrograms, and density-based spatial clustering to group similar data points;

developing, by a model development module, a first-order predictive model for each micro-cluster to predict a general trend or specific value within the retrieved data, training machine learning models including linear regression, AutoRegressive Integrated Moving Average (ARIMA) or neural networks to capture an overall trend specific to each micro-cluster based on the external influencers;

developing, by a second-order model development module, a second-order predictive model for each micro-cluster to predict differences identified by the first-order predictive model, employing machine learning models including Random Forest or Gradient Boosting to capture residual patterns specific to each micro-cluster based on the external influencers;

continuing, by higher-order model development modules, hierarchical modeling with higher-order predictive models for each micro-cluster to successively predict residuals left by previous models, ensuring small irregular trends are captured accurately by iterative refinements specific to each micro-cluster based on the external influencers including holidays or weekends;

serializing, by a model serialization module, the first-order, second-order, and higher-order predictive models for efficient storage and retrieval, utilizing formats including Predictive Model Markup Language (PMML) or Open Neural Network Exchange (ONNX) to facilitate interoperability and cross-platform deployment;

classifying, by a classification module, new data points to determine a relevant micro-cluster by comparing the new data points to historical data patterns, employing supervised learning algorithms including decision trees, support vector machines, or nearest neighbors to assign the new data points to a correct micro-cluster;

selecting and loading, by a model selection and loading module, an appropriate predictive model for each classified data point based on the relevant micro-cluster, ensuring a correct model specific to the external influencers is applied for anomaly detection by dynamically linking the classified data point with the appropriate predictive model;

comparing, by a comparison module, each classified data point against an expected pattern predicted by the selected predictive model to detect deviations, calculating residuals and applying threshold criteria to identify anomalies;

determining, by an anomaly detection module, whether each classified data point is an anomaly based on the comparison, identifying significant deviations from expected patterns, applying statistical tests, machine learning classifiers, or ensemble methods to ensure robust detection;

generating, by an automated response module, an automated response if an anomaly is detected, including sending alerts or initiating remedial actions, providing notifications via email, Short Message Service (SMS), or system logs, and triggering automated workflows or corrective actions through integration with incident management systems and automated resolution protocols to mitigate potential issues;

continuously updating and refining, by the model development module, the first-order, second-order, and higher-order predictive models based on latest data patterns and trends to ensure adaptability and accuracy over time;

leveraging, by the model development module, continuous learning algorithms to keep the first-order, second-order, and higher-order predictive models current and effective for each micro-cluster; and concluding, by a monitoring module, without further action if no anomaly is detected, allowing continuous monitoring and analyzing of incoming data, ensuring continuous surveillance and anomaly detection capabilities.

14. The method of claim 13, wherein retrieving, by the data retrieval module, the stored data for detailed trend analysis further includes using wavelet transforms or dynamic time warping to detect regularities and irregularities with the data retrieval module.

15. The method of claim 14, wherein engineering, by the feature engineering module, features from the cleaned data further includes using a generative artificial intelligence model to perform data analysis and generate predictions for the transformed features.

16. The method of claim 15, wherein clustering, by the clustering module, the retrieved data into micro-clusters further applies spectral clustering to categorize the retrieved data into micro-clusters based on intersections of different trends.

17. The method of claim 16, wherein the generative artificial intelligence model is a large language model selected from the group consisting of GPT-3, GPT-4, BERT, and LLAMA.

18. The method of claim 17, wherein engineering, by the feature engineering module, features from the cleaned data further comprises:

creating, by the feature engineering module, new variables by applying domain-specific transformations to the cleaned data to generate attributes that capture temporal dependencies and interactions among data points;

aggregating, by the feature engineering module, data points over specific time intervals to compute summary statistics including averages, sums, and variances for each interval;

encoding, by the feature engineering module, categorical variables into numerical format using one-hot encoding to convert discrete categories into binary vectors suitable for machine learning algorithms;

generating, by the feature engineering module, polynomial features by raising existing variables to higher powers to model non-linear relationships within the cleaned data; and utilizing, by the feature engineering module, the generative artificial intelligence model to perform natural language processing on textual elements within the cleaned data, extracting semantic features and sentiment scores to enhance the structured format for anomaly detection.

\* \* \* \* \*